United States Patent
Hu et al.

(10) Patent No.: US 12,157,249 B2
(45) Date of Patent: Dec. 3, 2024

(54) FLEXIBLE WOOD STRUCTURES AND DEVICES, AND METHODS FOR FABRICATING AND USE THEREOF

(71) Applicant: UNIVERSITY OF MARYLAND, COLLEGE PARK, College Park, MD (US)

(72) Inventors: Liangbing Hu, Potomac, MD (US); Jianwei Song, College Park, MD (US); Chaoji Chen, Hyattsville, MD (US); Amy Gong, Hyattsville, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 8 days.

(21) Appl. No.: 17/866,767

(22) Filed: Jul. 18, 2022

(65) Prior Publication Data

US 2022/0362962 A1    Nov. 17, 2022

Related U.S. Application Data

(63) Continuation of application No. 16/500,745, filed as application No. PCT/US2018/025746 on Apr. 2, 2018, now Pat. No. 11,440,214.
(Continued)

(51) Int. Cl.
 *B27K 3/00* (2006.01)
 *B27K 3/02* (2006.01)
(Continued)

(52) U.S. Cl.
 CPC ............ *B27K 3/007* (2013.01); *B27K 3/0278* (2013.01); *B27K 3/26* (2013.01); *B27K 5/06* (2013.01);
(Continued)

(58) Field of Classification Search
 CPC ........ B27K 3/007; B27K 3/0278; B27K 3/26; B27K 3/16; B27K 3/34; B27K 3/153;
(Continued)

(56) References Cited

U.S. PATENT DOCUMENTS

| | | |
|---|---|---|
| 2,123,409 A | 7/1938 | Armin |
| 3,159,554 A | 12/1964 | Mount |

(Continued)

FOREIGN PATENT DOCUMENTS

| | | |
|---|---|---|
| CA | 1066697 A | 11/1979 |
| CN | 105002232 A | 10/2015 |

(Continued)

OTHER PUBLICATIONS

Liu "A Bioinspired, Reusable, Paper-Based System for High-Performance Large-Scale Evaporation." Adv. Mater. 2015, 27, 2768-2774 (Year: 2015).*

(Continued)

*Primary Examiner* — Tri V Nguyen
(74) *Attorney, Agent, or Firm* — Rowan Tree Law Group, PLLC; Frederick F. Rosenberger

(57) ABSTRACT

A flexible structure is formed by subjecting cellulose-based natural wood material to a chemical treatment that partially removes hemicellulose and lignin therefrom. The treated wood has a unique 3-D porous structure with numerous channels, excellent biodegradability and biocompatibility, and improved flexibility as compared to the natural wood. By further modifying the treated wood, the structure can be adapted to particular applications. For example, nanoparticles, nanowires, carbon nanotubes, or any other coating or material can be added to the treated wood to form a hybrid structure. In some embodiments, open lumina within the structure can be at least partially filled with a non-wood substance, such as a flexible polymer, or with entangled (Continued)

cellulose nanofibers. The unique architecture and superior properties of the flexible wood allow for its use in various applications, such as, but not limited to, structural materials, solar thermal devices, flexible electronics, tissue engineering, thermal management, and energy storage.

17 Claims, 12 Drawing Sheets

Related U.S. Application Data

(60) Provisional application No. 62/480,909, filed on Apr. 3, 2017.

(51) Int. Cl.
| | |
|---|---|
| *B27K 3/26* | (2006.01) |
| *B27K 5/06* | (2006.01) |
| *B27M 1/00* | (2006.01) |
| *H01M 10/052* | (2010.01) |
| *H01M 50/429* | (2021.01) |
| *H01M 50/44* | (2021.01) |
| *B82Y 30/00* | (2011.01) |

(52) U.S. Cl.
CPC .......... *B27M 1/003* (2013.01); *H01M 10/052* (2013.01); *H01M 50/4295* (2021.01); *H01M 50/44* (2021.01); *B27K 2200/10* (2013.01); *B27K 2240/10* (2013.01); *B82Y 30/00* (2013.01)

(58) Field of Classification Search
CPC .. B27K 5/06; B27K 2200/10; B27K 2240/10; B27M 1/003; H01M 50/44; H01M 50/4295; H01M 10/052; B82Y 30/00
USPC ........................................................ 428/541
See application file for complete search history.

(56) References Cited

U.S. PATENT DOCUMENTS

| | | | |
|---|---|---|---|
| 4,858,399 A | 8/1989 | Salato, Jr. | |
| 4,908,099 A | 3/1990 | DeLong | |
| 5,188,707 A | 2/1993 | Gordy | |
| 5,632,123 A | 5/1997 | Erwin | |
| 7,008,515 B1 | 3/2006 | Husson, Jr. et al. | |
| 8,349,131 B1 * | 1/2013 | Agarwal ................. | D21F 11/00 162/138 |
| 9,138,965 B2 | 9/2015 | Hu et al. | |
| 9,174,355 B2 | 11/2015 | Rector et al. | |
| 2005/0008530 A1 | 1/2005 | Caserta et al. | |
| 2008/0146701 A1 | 6/2008 | Sain et al. | |
| 2008/0186801 A1 | 8/2008 | Liu et al. | |
| 2017/0043497 A1 | 2/2017 | Burgert et al. | |
| 2018/0043278 A1 | 2/2018 | Singamaneni | |
| 2018/0264414 A1 | 9/2018 | Hu et al. | |
| 2018/0342702 A1 | 11/2018 | Hu et al. | |
| 2018/0356127 A1 | 12/2018 | Hu et al. | |
| 2018/0370071 A1 | 12/2018 | Boitouzet et al. | |
| 2020/0223091 A1 | 7/2020 | Hu et al. | |
| 2020/0238565 A1 | 7/2020 | Hu et al. | |

FOREIGN PATENT DOCUMENTS

| | | |
|---|---|---|
| WO | WO 1991/001409 A1 | 2/1991 |
| WO | WO 2016/141432 A1 | 9/2016 |
| WO | WO 2017/136714 A1 | 8/2017 |
| WO | WO 2018/187238 A1 | 10/2018 |
| WO | WO 2018/191181 A1 | 10/2018 |

OTHER PUBLICATIONS

Yano "Effects of the removal of matrix substances as a pretreatment in the production of high strength resin impregnated wood based materials." Journal of Materials Science Letters 20, 2001, 1125-1126 (Year: 2001).*
Jiang "Bilayered Biofoam for Highly Efficient Solar Steam Generation." Adv. Mater. 2016, 28, 9400-9407 (Year: 2016).*
Okahisa "Optically transparent wood-cellulose nanocomposite as a base substrate for flexible organic light-emitting diode displays." Composites Science and Technology 69 (2009) 1958-1961 (Year: 2009).*
"Capillary Action and Water," USGS, last accessed Apr. 18, 2022, available online at: https://www.usgs.gov/special-topic/water-science-school/science/ capillary-action-and-water?qt-science_center_objects= 0#qt-science_center_objects. (7 pages).
"Pits: Ultra-structure, classification & functions: Simple & Bordered Pits (Similarities and Differences)," *Easybiologyclass.com*, last accessed Apr. 18, 2022. Available online at: https ://www. easybiologyclass.com/pits-ultra-structure-classification-functions-simple-bordered-pits-similiarities-differences/. (4 pages).
Abstract for Yano et al., "High Strength Wood-based Materials," *Cellulose Communications*, 2003, 10(1) pp. 22-27. (6 pages).
Abstract only for Jiang et al., "Bilayered biofoam for highly efficient solar steam generation," *Advanced Materials*, Nov. 2016, 28(42): pp. 9400-9407. (2 pages).
Abstract only for Lee et al., "Nanostructure and surface composition of Pt and Ru binary catalysts on polyaniline-functionalized carbon nanotubes," *Langmuir*, Oct. 2011, 27(23): pp. 14654-14661. (2 pages).
Abstract only for Liu et al., "A bioinspired, reusable, paper-based system for high-performance large-scale evaporation," *Advanced Materials*, May 2015, 27(17): pp. 2768-2774. (1 page).
Abstract only for Solar et al., "Alkaline and Akaline/Oxidation Pre-Treatments of Spruce Wood. Part 1: Chemical Alterations of Wood and its Digestibility under Conditions of Kraft Cook," *Wood Research*, Jan. 2009, 54(4): pp. 1-12. (2 pages).
Ali et al., "The structure and mechanics of nanofibrillar cellulose foams," *Soft Matter*, 2013, 9: pp. 1580-1588. (9 pages).
Blanchette et al., "Changes in structural and chemical components of wood delignified by fungi," *Wood Sci. Technol.*, 1985, 19: pp. 35-46. (12 pages).
Burgert et al., "Bio-inspired functional wood-based materials—hybrids and replicates," *International Materials Reviews*, 2015, 60(8): pp. 431-450. (21 pages).
Chen et al., "All-wood, low tortuosity, aqueous, biodegradable supercapacitors with ultra-high capacitance," *Energy & Environmental Science*, 2017, 10: pp. 538-545. (8 pages).
Chen et al., "Highly flexible and efficient solar steam generation device," *Advanced Materials*, 2017, 29(30): 1701756. (8 pages).
Chen et al., "Scalable and Sustainable Approach toward Highly Compressible, Anisotropic, Lamellar Carbon Sponge," *Chem*, 2018, 4: pp. 544-554. (12 pages).
Chen et al., "Thermal behavior of extracted and delignified pine wood flour," *Thermochimica Acta*, 2014, 591: pp. 40-44. (5 pages).
Crump, "2×4 lumber for construction"—Image ID: FF06N 1, Alamy Stock Photo, Jun. 23, 2008, URL: https://www.alamy.com/stock-photo-2x4-lumber-for-construction-9527 6973 .html ?pv=1 &stamp=2&imageid=A8550D42-3E6C-4728-AE23-8015E1BE2003 &p=283185&n=0&orientation =0&pn =1&searchtype=0 &lsFromSearch=1&srch=foo%3Dbar%26st%3D0%26. (2 pages).
Deville et al., "Freezing as a Path to Build Complex Composites," *Science*, 2006, 311 (5760): pp. 515-518. (6 pages).
Dutkova et al., "Mechanochemically synthesized $CuFeSe_2$ nanoparticles and their properties," *Acta Physica Polonica A*, Apr. 2017, 131(4): pp. 1156-1158. (3 pages).
Fang et al., "Densification of wood veneers by compression combined with heat and steam," *Eur. J. Wood Prod.*, 2012, 70: pp. 155-163. (9 pages).
Fratzl, P., "Wood made denser and stronger," *Nature*, Feb. 2018, 554: pp. 172-173. (2 pages).
Frey et al., "Delignified and Densified Cellulose Bulk Materials with Excellent Tensile Properties for Sustainable Engineering," *Applied Materials & Interfaces*, 2018, 10: pp. 5030-5037. (8 pages).

(56) References Cited

OTHER PUBLICATIONS

Fu et al., "Nanostructured Wood Hybrids for Fire-Retardancy Prepared by Clay Impregnation into the Cell Wall," *Applied Materials & Interfaces*, 2017, 9: pp. 36154-36163. (10 pages).
Ghosh, S.C., "Wood modification with functionalized polydimethylsiloxanes," Dissertation, University of Gottingen, 2009, pp. 1-15. (16 pages).
Goncalves et al., "The effect of carbonization on wood structure of Dalbergia Violacea, Stryphnodendron Polyphyllum, Tapirira Guianensis, Vochysia Tucanorum, and Pouteria Torta from the Brazilian Cerrado," *IA WA Journal, International Association of Wood Anatomist*, Jan. 2012, 33(1): pp. 73-90. (18 pages).
Guan et al., "Highly Compressible Wood Sponges with a Spring-like Lamellar Structure as Effective and Reusable Oil Absorbents," *ACS Nano*, 2018, 12: pp. 10365-10373. (9 pages).
Guo et al., "Anisotropic thermal transport in highly ordered $TiO_2$ nanotube arrays," *Journal of Applied Physics*, 2009, 106: 123526. (7 pages).
He et al., "An Energy-Efficient, Wood-Derived Structural Material Enabled by Pore Structure Engineering towards Building Efficiency," *Small Methods*, 2020, 4:1900747. (8 pages).
He et al., "Impacts of Limestone Particle Size on the Performance of Flexible Wood Fiber Composite Floor," *Advances in Materials Science and Engineering*, 2015. (6 pages).
Heil, M., "A Battery Made of Wood?," UMD Right Now [online], Jun. 2013[retrieved on May 20, 2018]. Retrieved from the Internet: <URL: https://umdrightnow.umd.edu/news/battery-made-wood>. (3 pages).
Ilyas et al., "Effect of Delignification on the Physical, Thermal, Chemical, and Structural Properties of Sugar Palm Fibre," *BioResources*, 2017, 12(4): 8734-8754. (21 pages).
Inagaki et al., *Chapter 14—Carbon Materials for Spilled-oil Recovery*, "Advanced Materials Science and Engineering of Carbon," Butterworth-Heinemann, 2014, pp. 313-334, available online at: http://sciencedirect.com/ science/ article/pii/B 9780124077898000144. (22 pages).
International Search Report and Written Opinion, mailed Aug. 3, 2018, for International Application No. PCT/US18/25746. (33 pages).
Jakes et al., "Wood as inspiration for new stimuli-responsive structures and materials," *Bioinspiration, Biomimetics, and Bioreplication*, International Society for Optics and Photonics, Mar. 2014, 9055:90550K. (13 pages).
Jia et al., "Anisotropic, Mesoporous Microfluidic Frameworks with Scalable, Aligned Cellulose Nanofibers," *ACS Applied Materials & Interfaces*, 2018, 10: pp. 7362-7370. (9 pages).
Jia et al., "Scalable, anisotropic transparent paper directly from wood for light management in solar cells," *Nano Energy*, 2017, 36: pp. 366-373. (8 pages).
Lee et al., "Wearable textile battery rechargeable by solar energy," *Nano Letters*, Oct. 2013, 13(11): pp. 5753-5761. (9 pages).
Li et al., "A radiative cooling structural material," *Science*, 2019, 364: pp. 760-763. (5 pages).
Li et al., "Anisotropic, lightweight, strong, and super thermally insulating nanowood with naturally aligned nanocellulose," *Sci. Adv.*, 2018, 4: eaar3724. (10 pages).
Li et al., "Lignin-Retaining Transparent Wood," *ChemSusChem*, 2017, 10: pp. 3445-3451. (7 pages).
Li et al., "Luminescent Transparent Wood," *Advanced Optical Materials*, 2016, 5:1600834. (5 pages).
Li et al., "Optically transparent wood from a nanoporous cellulosic template: Combining functional and structural performance," *Biomacromolecules*, Mar. 2016, 17(4): pp. 1358-1364. (7 pages).
Li et al., "Strong and superhydrophobic wood with aligned cellulose nanofibers as a waterproof structural material," *Chinese Journal of Chemistry*, 2020, 38(8): pp. 823-829. (7 pages).
Li et al., "Towards centimeter thick transparent wood through interface manipulation," *Journal of Materials Chemistry A*, 2018, 6: 1094-1101. (8 pages).

Li et al., "Wood composite as an energy efficient building material: Guided sunlight transmittance and effective thermal insulation," *Advanced Energy Materials*, 2016, 6:1601122. (7 pages).
Li et al., "Wood-Polymer Composites Prepared by the In Situ Polymerization of Monomers Within Wood," *Journal of Applied Polymer Science*, 2011, 119: pp. 3207-3216. (10 pages).
Liu et al. "Wood-graphene oxide composite for highly efficient solar steam generation and desalination," *ACS Applied Materials & Interfaces*, Feb. 2017, 9: pp. 7675-7681. (7 pages).
Lv et al., "Eco-friendly wood-based solid-state flexible supercapacitors from wood transverse section slice and reduced graphene oxide," *Electronic Materials Letters*, Jul. 2015, 11(4): pp. 633-642. (10 pages).
Lv et al., "Novel wood-based all-solid-state flexible supercapacitors fabricated with a natural porous wood slice and polypyrrole," *RSC Adv.*, 2015, 5: pp. 2813-2818. (6 pages).
Notice of Allowance, issued Apr. 25, 2022 (Apr. 25, 2022), in U.S. Appl. No. 16/500,745. (9 pages).
Office Action, issued Jul. 12, 2021 (Jul. 12, 2021), in U.S. Appl. No. 16/500,745. (9 pages).
Office Action, issued Oct. 26, 2021 (Oct. 26, 2021), in U.S. Appl. No. 16/500,745. (10 pages).
Office Action, issued Feb. 14, 2022 (Feb. 14, 2022), in U.S. Appl. No. 16/500,745. (7 pages).
Palaeos Plants: Glossary R-Se, Palaeos, last accessed Apr. 18, 2022. URL: http://palaeos.com/plants/ glossary/ glossary R.html. (5 pages).
Rekola, J., "Wood as a Model Material for Medical Biomaterials," Dissertation, Institute of Dentistry, Biomaterials Science and Department of Otorhinolaryngology and Head and Neck Surgery, University of Turku, Turku, Finland, 2011. (94 pages).
Ruel et al., "The wood cell wall at the ultrastructural scale—formation and topochemical organization," *Maderas. Ciencia y tecnologia*, 2006, 8(2): pp. 107-116. (10 pages).
Sacui et al., "Comparison of the Properties of Cellulose Nanocrystals and Cellulose Nanofibrils Isolated from Bacteria, Tunicate, and Wood Processed Using Acid, Enzymatic, Mechanical, and Oxidative Methods," *ACS Applied Materials & Interfaces*, 2014, 6: pp. 6127-6138. (12 pages).
Shams et al., "Compressive deformation of wood impregnated with low molecular weight phenol formaldehyde (PF) resin III: effects of sodium chlorite treatment," *J. Wood Sci*, 2005, 51: pp. 234-238. (5 pages).
Soil Fertility Project—Namibia, "'Hydrophilic or Hydrophobic?'—That is the Question!," Feb. 11, 2016, available online at: http://www.soilfertilityproject.com/project.com/progress/2016/2/11/hydrophilic-or-hydrophobic-that-is-the-question. (3 pages).
Song et al., "Highly Compressible, Anisotropic Aerogel with Aligned Cellulose Nanofibers," *ACS Nano*, Dec. 2017, 12: pp. 140-147. (8 pages).
Song et al., "Processing bulk natural wood into a high-performance structural material," *Nature*, Feb. 2018, 544: pp. 224-228. (16 pages).
Tampieri et al., "From wood to bone: multi-step process to convert wood hierarchical structures into biomimetic hydroxyapatite scaffolds for bone tissue engineering," *Journal of Materials Chemistry*, Jun. 2009, 19(28): pp. 4973-4980. (8 pages).
White, R. H., "Effect of lignin content and extractives on the higher heating value of wood," *Wood Fiber Sci.*, Oct. 1987, 19(4): pp. 446-452. (7 pages).
Xue et al., "Robust and Low-Cost Flame-Treated Wood for High-Performance Solar Steam Generation," *ACS Applied Materials and Interfaces*, Apr. 2017, 9(17), pp. 15052-15057. (6 pages).
Yang et al. "Functionalized graphene enables highly efficient solar thermal steam generation," *ACS Nano*, 2017, 11(6): pp. 5510-5518. (9 pages).
Yang et al., "Composite phase change materials with good reversible thermochromic ability in delignified wood substrate for thermal energy storage," *Applied Energy*, 2018, 212: pp. 455-464. (10 pages).
Yu et al., "Transparent wood containing $Cs_xWO_3$ nanoparticles for heat-shielding window applications," *Journal of Materials Chemistry A*, 2017, 5: pp. 6019-6024. (6 pages).

(56) References Cited

OTHER PUBLICATIONS

Zarrinmehr et al., "Interlocked archimedean spirals for conversion of planar rigid panels into locally flexible panels with stiffness control," *Computers & Graphics*, 2017, 66: pp. 93-102. (10 pages).
Zhang et al., "High-capacity, low-tortuosity, and channel-guided lithium metal anode," *Proceedings of the National Academy of Sciences*, Mar. 2017, 114(14): pp. 3584-59. (6 pages).
Zhu et al., "Anisotropic, transparent films with aligned cellulose nanofibers," *Advanced Materials*, Mar. 2017, 29(21):1606284. (8 pages).
Zhu et al., "Highly Anisotropic, Highly Transparent Wood Composites," *Advanced Materials*, 2016, 28: pp. 5181-5187. (7 pages).
Zhu et al., "Integrated production of nano-fibrillated cellulose and cellulosic biofuel (ethanol) by enzymatic fractionation of wood fibers," *Green Chemistry*, 2011, 13: pp. 1339-1344. (6 pages).
Zhu et al., "Transparent and haze wood composites for highly efficient broadband light management in solar cells," *Nano Energy*, 2016, 26: pp. 332-339. (8 pages).
Zhu et al., "Wood-Derived Materials for Green Electronics, Biological Devices, and Energy Applications," *Chemical Reviews*, 2016, 116: pp. 9305-9374. (70 pages).

\* cited by examiner

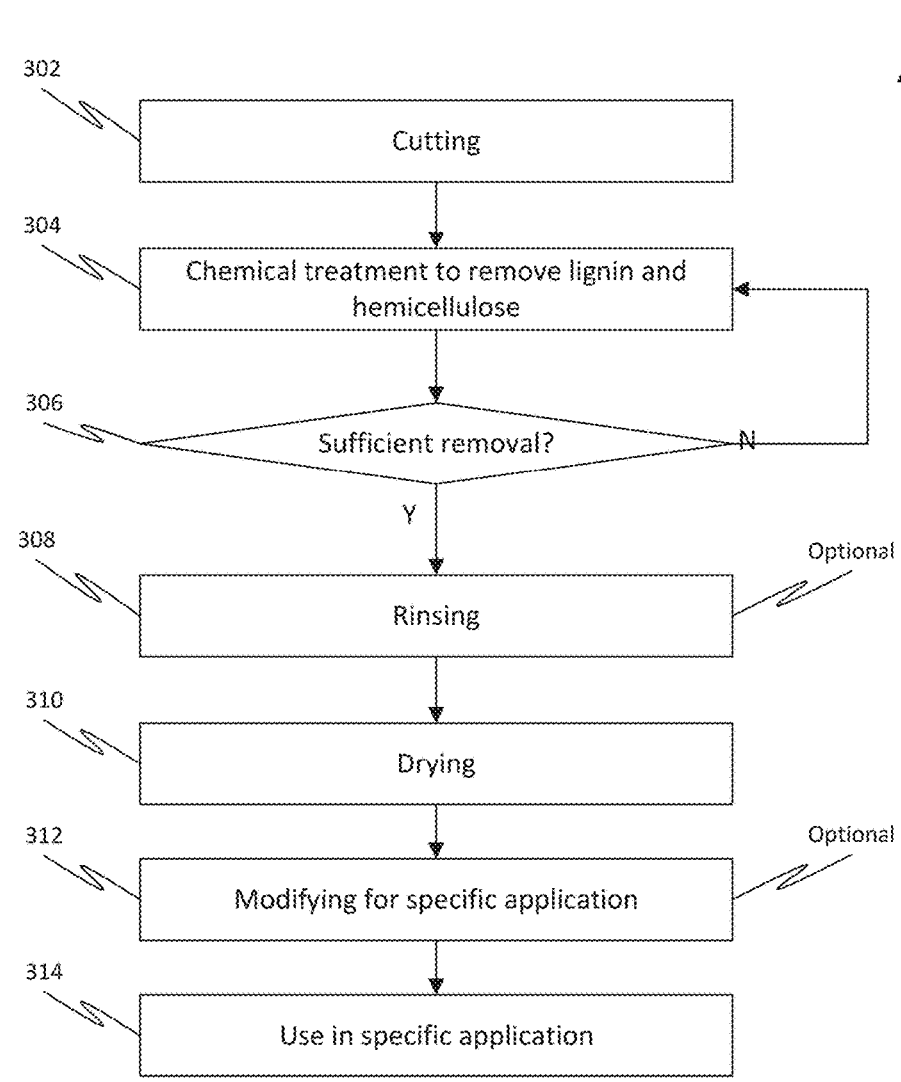
FIG. 3
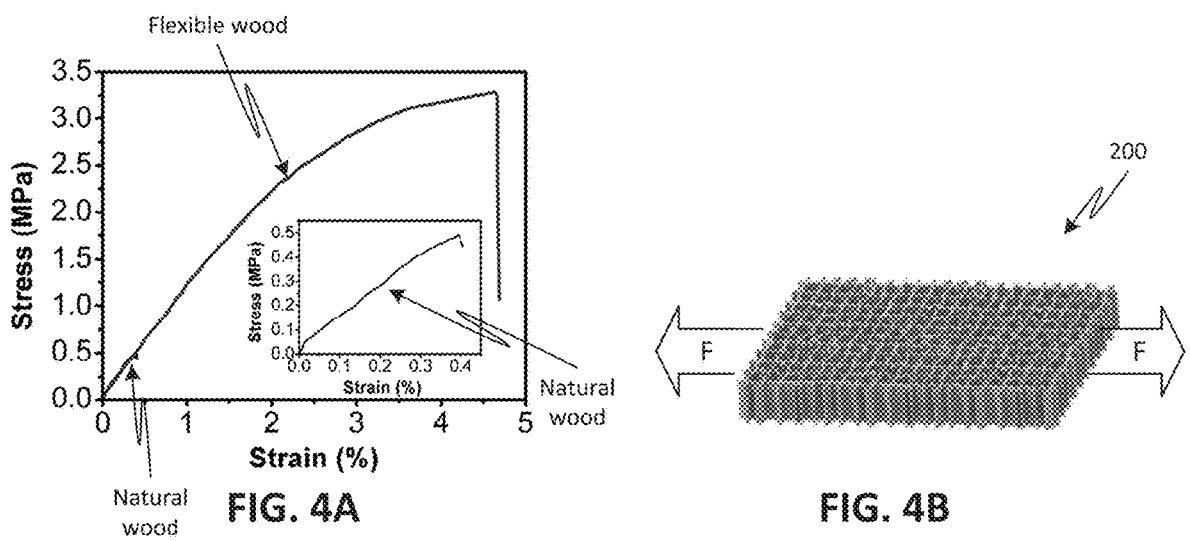
FIG. 4A                    FIG. 4B

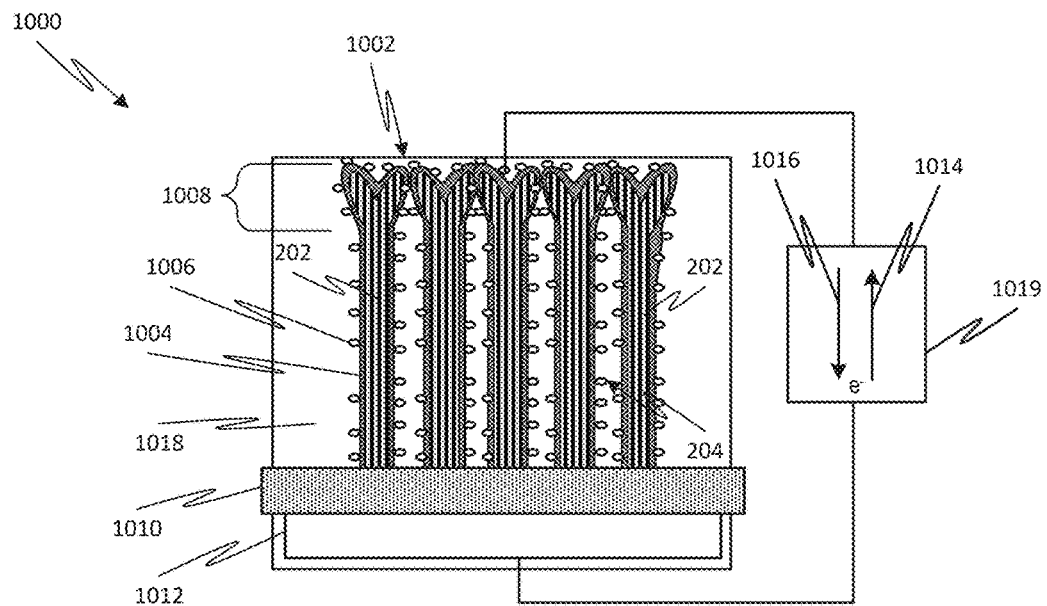
FIG. 10A
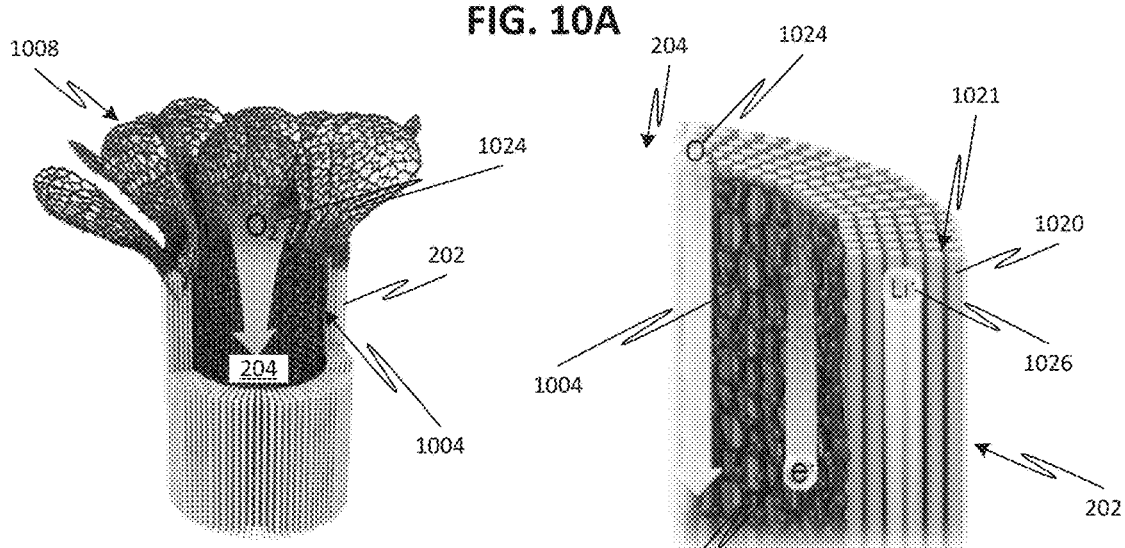
FIG. 10B
FIG. 10C
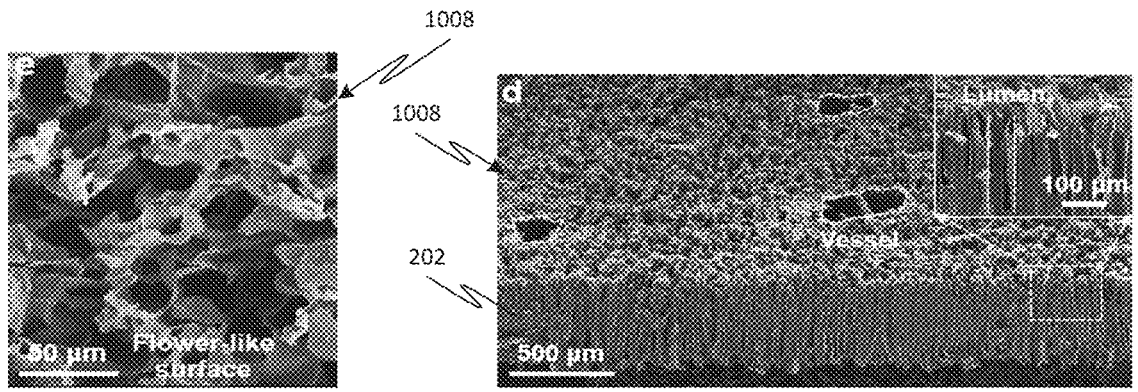
FIG. 10D
FIG. 10E

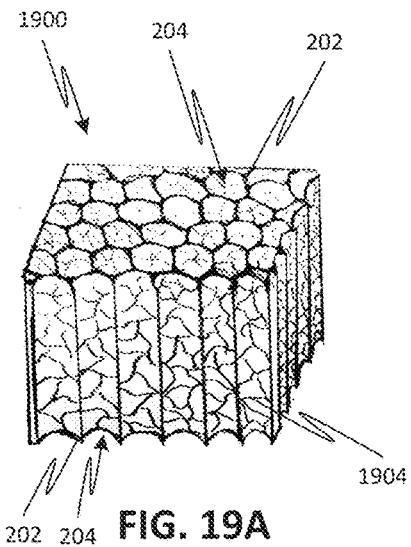
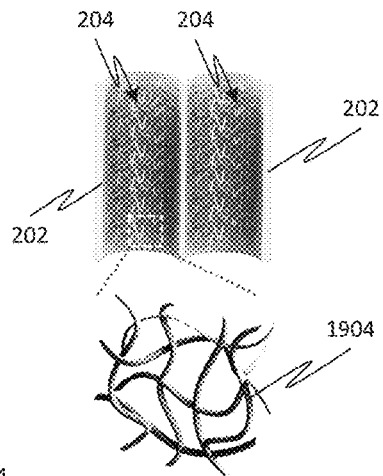
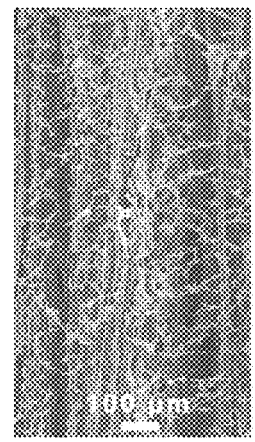
FIG. 19A  FIG. 19B  FIG. 19C
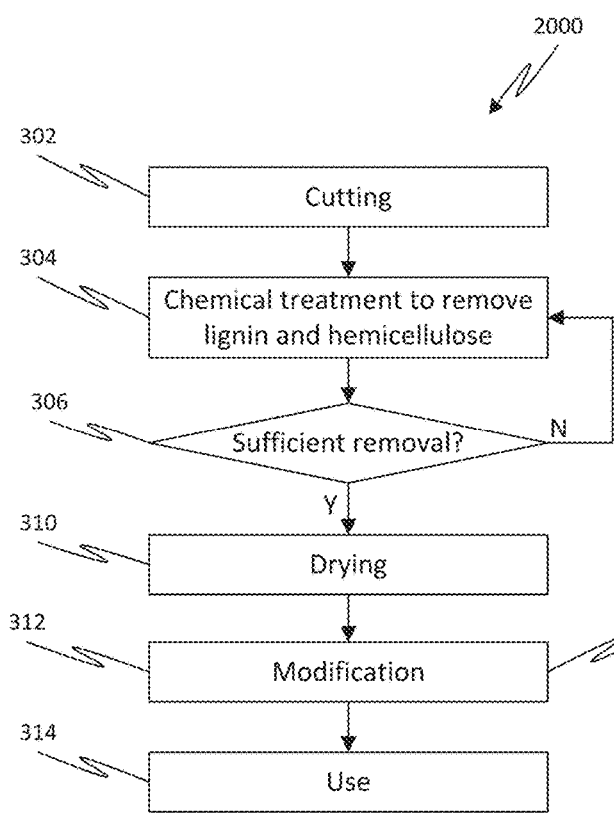
FIG. 20
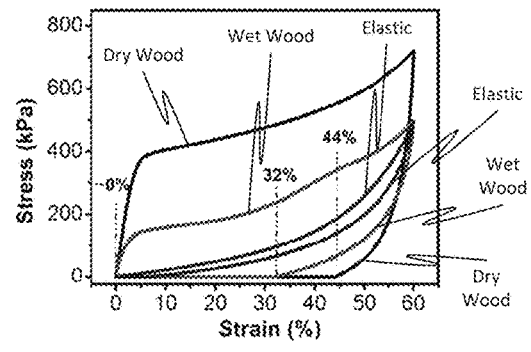
FIG. 21A
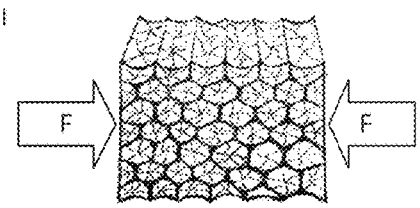
FIG. 21B

FLEXIBLE WOOD STRUCTURES AND DEVICES, AND METHODS FOR FABRICATING AND USE THEREOF

CROSS-REFERENCE TO RELATED APPLICATIONS

The present application claims the benefit of U.S. Provisional Application No. 62/480,909, filed Apr. 3, 2017, which is hereby incorporated by reference herein in its entirety.

FIELD

The present disclosure relates generally to natural wood structures, and more particularly, to chemical treatment of natural wood to have increased flexibility, as well as structures and devices incorporating such flexible wood.

SUMMARY

Embodiments of the disclosed subject matter provide a flexible structure formed by subjecting cellulose-based natural wood material to a chemical treatment that partially removes hemicellulose and lignin therefrom. The treated wood has a unique three-dimensional (3-D) porous structure with numerous channels, excellent biodegradability and biocompatibility, and improved flexibility as compared to the natural wood. By further modifying the treated wood, the structure can be adapted to particular applications. For example, nanoparticles, nanowires, carbon nanotubes, or any other coating or material can be added to the treated wood to form a hybrid structure. In some embodiments, open lumina within the structure can be at least partially filled with a non-wood substance, such as a flexible polymer, or with entangled cellulose nanofibers. The unique architecture and superior properties of the flexible wood allow for its use in various applications, such as, but not limited to, structural materials, solar thermal evaporation devices, flexible electronics, tissue engineering, and energy storage.

In one or more embodiments, a structure comprises a flexible substrate of natural wood that has been chemically modified to partially remove hemicellulose and lignin therein while substantially preserving a structure of cellulose-based lumina.

In one or more embodiments, a method comprises treating a piece of natural wood with a chemical solution so as to partially remove hemicellulose and lignin therein while substantially preserving a structure of cellulose-based lumina, and then drying the piece of chemically-treated natural wood. The treating and the drying increase the flexibility of the piece.

In one or more embodiments, a structure is formed by treating natural wood with a chemical solution that partially removes hemicellulose and lignin therein while substantially preserving a structure of cellulose-based lumina, and the treated piece of natural wood has a bending radius that is at least 2 times smaller than that of the natural wood before treatment.

In one or more embodiments, a hybrid structure comprises a flexible substrate and at least one of nanoparticles, nanowires, graphene, graphite, single-walled carbon nanotubes, double-walled carbon nanotubes, and multi-walled carbon nanotubes coupled to a surface thereof, where the flexible substrate comprises natural wood that has been chemically modified to partially remove hemicellulose and lignin therein while substantially preserving a structure of cellulose-based lumina.

In one or more embodiments, a hybrid structure comprises a flexible substrate and a non-wood material. The flexible substrate comprises natural wood that has been chemically modified to partially remove hemicellulose and lignin therein while substantially preserving a structure of cellulose-based lumina. The non-wood material is coupled to surfaces forming said lumina.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIG. 3 is a process flow diagram for fabricating flexible-wood-based structures, according to one or more embodiments of the disclosed subject matter.

FIG. 4A is a graph of stress-strain curves by tensile test for natural wood structure and the flexible wood structure of FIG. 2A.

FIG. 4B is an illustration of the force application for the tensile tests underlying the stress-strain curves of FIG. 4A.

FIG. 10A is a simplified schematic diagram of a cross-section of a flexible wood structure as a battery, according to one or more embodiments of the disclosed subject matter.

FIG. 10B is a simplified cutaway illustration of an individual cell in the flexible wood structure as battery, according to one or more embodiments of the disclosed subject matter.

FIG. 10C is a close-up sectional illustration of an individual cell showing separate transport pathways for the flexible wood structure as a Li—$O_2$ battery, according to one or more embodiments of the disclosed subject matter.

FIG. 10D is an SEM image of a top surface of the flexible wood structure as battery, showing flower-like microsheets, according to one or more embodiments of the disclosed subject matter.

FIG. 10E is an SEM image of a cross-section and top surface of the flexible wood structure as battery, showing multi-channeled structure with big vessels and small lumina, according to one or more embodiments of the disclosed subject matter.

FIG. 19A is a simplified illustration of a flexible wood with entangled cellulose nanofibers acting as a hydrogel, according to one or more embodiments of the disclosed subject matter.

FIG. 19B is a simplified illustration of a close-up cross-sectional view of the lumina of the flexible wood structure of FIG. 19A, showing entangled cellulose fibers, according to one or more embodiments of the disclosed subject matter.

FIG. 19C is an SEM image of the cross-section of the flexible wood structure showing entangled nanofibers within the lumina, according to one or more embodiments of the disclosed subject matter.

FIG. 20 is a process flow diagram for fabricating flexible wood structures with entangled nanofibers, according to one or more embodiments of the disclosed subject matter.

FIG. 21A is a graph of stress-strain curves by compression test for natural wood structure (wet and dry) and the flexible wood structure of FIG. 19A.

FIG. 21B is an illustration of the force application for the compression tests underlying the stress-strain curves of FIG. 21A.

DETAILED DESCRIPTION

Natural wood materials have a lignocellulosic composition that allow for excellent biodegradability and biocompatibility. Natural wood also has a unique three-dimensional porous structure with multiple channels, including tracheids and vessel cells in the xylem, with the cell types depending on the species of the wood. The cell walls of the natural wood are mainly composed of cellulose, hemicellulose, and lignin. The three components intertwine with each other forming a strong and rigid cell wall structure. Cellulose is the crystalline fibril with long, slender chains of glucose. Hemicellulose is a type of amorphous heteropolysaccharide. Lignin is a polyphenol-based material filling in the spaces between cellulose and hemicellulose, and acts as an adhesive-like agent in the cell wall structure.

In embodiments of the disclosed subject matter, natural wood is subjected to a chemical treatment in order to partially remove lignin and hemicellulose therefrom, while substantially retaining the underlying cellulose-based structure. The wood-based material resulting from the chemical treatment can enjoy at least improved flexibility as compared to the natural wood prior to the treatment. Moreover, additional materials can be added to the wood-based material after the chemical treatment in order to form hybrid structures. The added materials can add functionality not otherwise available with the natural wood, for example, by providing conductivity or thermal absorptivity, while enjoying the improved mechanical performance offered by the wood-based material post chemical treatment.

As used herein, flexible wood refers to natural wood that has been subjected to the chemical treatment processes described herein, which processes partially remove lignin and hemicellulose and thereby advantageously alter the mechanical properties of the wood. The terms substrate and membrane are used interchangeably herein and refer to a particular piece, strip, block, membrane, or any other shape of wood. Indeed, in some instances, the flexible wood substrate or flexible wood membrane is simply referred to as flexible substrate or flexible membrane. In some embodiments, the substrate or membrane may be considered thin, i.e., having a thickness less than either dimension in a plane perpendicular to the thickness direction.

Figure 1A:
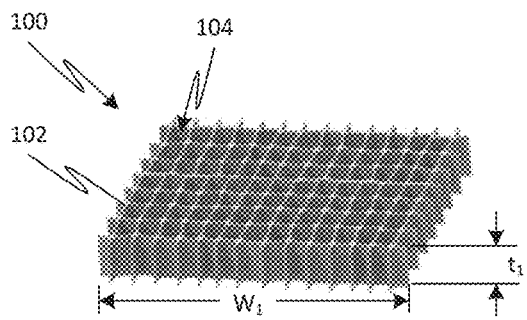
FIG. 1A is a simplified illustration of the structure of a piece of natural wood.
Figure 1B:
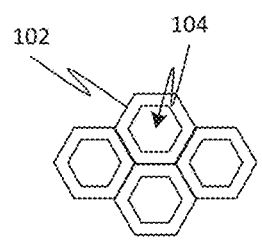
FIG. 1B is a simplified top down view of fiber cells in a natural wood structure.
Figure 1C:
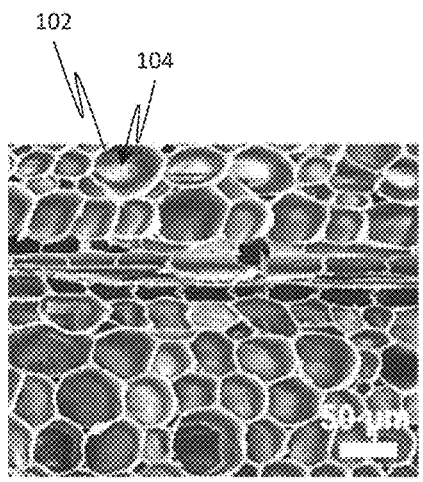
FIG. 1C is a scanning electron microscope (SEM) image of the cross-section of the natural wood structure showing individual fiber cells.
Figure 1D:
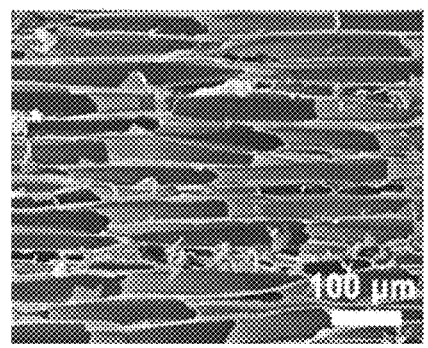
FIG. 1D is an SEM image of a longitudinal section of the natural wood structure showing elongated lumina.

Referring initially to FIG. 3, a generalized process 300 for forming and using flexible wood substrates is shown. The process 300 can optionally begin at 302, where a piece of natural wood is supplied, for example, by cutting from an existing tree or block of natural wood. For example, FIG. 1A illustrates a piece of natural wood 100 that has been cut to a desired rectangular shape, although other shapes are also possible, while FIG. 1B illustrates a subsection of the lumina 104 of the natural wood 100. The natural wood 100 exhibits a unique three-dimensional structure with irregular hexagonal lumina 104 of 30-50 μm in diameter along the tree-growth direction. The lumina 104 are defined by cell walls 102, which are primarily composed of cellulose. FIGS. 1C and 1D are scanning electron microscopy (SEM) images showing the morphology and microstructure of natural wood 100, in this case balsa wood.

The natural wood can be any type of hard wood or softwood, such as, but not limited to, basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, douglas fir, fir, hemlock, larch, pine, redwood, spruce, tamarack, juniper and yew.

In some embodiments, cutting 302 can include modifying a geometry or profile of one or more surfaces of the natural wood prior to chemical treatment. For example, the cutting 302 can be such that a roughened surface is formed on the natural wood. Such roughened surface may be a flower-like rough surface with flower-like microsheets extending therefrom, for example, as described below with respect to FIGS. 8A-8D, 10A-10G, and 15.

After the cutting 302, the process 300 proceeds to 304 where the piece of natural wood 100 is subjected to treatment with a chemical solution to partially (but not fully) remove lignin and hemicellulose therefrom. The treatment is such that between 5% and 95% of the lignin in the original natural wood has been removed, while retaining at least some of the cellulose of the natural wood. For example, at least 20%, at least 40%, at least 60%, or at least 90% of the cellulose from the natural wood is retained after the chemical treatment. The piece of natural wood may be immersed in the chemical solution and subject to vacuum, so that the chemical solution can better infiltrate the structure and channels of the natural wood.

The chemical solution can include at least one of NaOH, $Na_2SO_3$, $(NH_4)_2SO_3$, p-TsOH, $NH_3 \cdot H_2O$, $NaOH+Na_2S$, $Na_2CO_3$, $NaOH+Na_2SO_3$, $NaOH+(NH_4)_2SO_3$, $NH_4OH+(NH_4)_2SO_3$, $NH_4OH+Na_2SO_3$, $NaOH+Na_2CO_3$, $NaOH+AQ$, $NaOH/Na_2S+AQ$, $NaOH+Na_2SO_3+AQ$, $Na_2SO_3+AQ$, $NaOH+Na_2S+Na_2S_n$, $Na_2SO_3+NaOH+CH_3OH+AQ$, $C_2H_5OH+NaOH$, $C_2H_8N_2$, $C_2H_7NO+NH_3-H_2O$, $N_2H_4\cdot H_2O$, and $NaHCO_3$, where n in an integer and AQ is Anthraquinone. However, the mechanical properties of the treated wood substrate may depend on the pH of the chemical solution used for the treatment. In particular, solutions having a pH value greater than 7 should be used in order to produce a treated wood substrate with improved flexibility.

For example, when natural wood is treated with water (i.e., pH=7) or HCl (i.e., pH<7) solutions, the mechanical flexibilities of the resulting substrates are improved slightly but still remain relatively rigid. As a result, the substrates are still subject to breakage during bending. In contrast, substrates treated with a mixed solution of NaOH and $Na_2SO_3$ (i.e., pH >7) show substantially improved mechanical flexibility, with the ability to undergo severe folding and twisting (e.g., at least two simultaneous folds, folding onto itself, and/or twists greater than 45°) without breakage and to revert to its original shape upon removal of the deforming force.

While not wishing to be bound by any particular theory, the unique pH response may be attributed to the distinct stabilities of cellulose, hemicellulose, and lignin in solutions of different pH value. For example, NaOH can be used to selectively degrade lignin and hemicellulose in the wood materials while having little effect on the cellulose components. The addition of $Na_2SO_3$ can help further remove the lignin component and reduce the reaction time by increasing sulphite groups ($SO_3^{2-}$) in the lignin side chains via sulphonation, thereby allowing the lignin to more readily dissolve in alkaline solution. The interaction between the $NaOH/Na_2SO_3$ and cellulose, hemicellulose, and lignin molecules can also swell the cell wall, making it softer for subsequent manipulations (e.g., bending, folding, or twisting). Accordingly, in some embodiments, an aqueous solution of 2.5M NaOH and 0.4M of $Na_2SO_3$ mixed together can be used for as the chemical solution for the treatment of 304, although other solution compositions selected from the above list or otherwise that satisfy the pH requirement are also contemplated for 304.

At 306, it is determined if sufficient lignin has been removed from the natural wood. As noted above, between 5% and 95% of the lignin is removed, with the ultimate amount being dependent on the desired mechanical properties of the treated substrate for a particular application. The amount of lignin removed is dependent on the immersion time, which may range from as little as 10 minutes to over 7 hours, for example, 1 hour. Depending on the desired amount of lignin removal, the temperature of the chemical solution may also be adjusted in addition to or in place of adjusting the time of immersion. For example, in some embodiments, the chemical solution may be boiling, which may effect a greater amount of lignin removal (e.g., for a given immersion time), whereas non-boiling solutions may be used for removing small amounts of lignin.

Once sufficient lignin has been removed by the treatment of 304, the process 300 can proceed to optionally rinsing the treated piece of wood at 308. The rinsing can include immersing the treated piece of wood in a solvent, such as, but not limited to, de-ionized (DI) water. In some embodiments, the solvent may be at an elevated temperature, such as boiling. The rinsing 308 can be effective to remove any remnants of the chemical solution within the treated piece of wood and/or any components of the wood dislodged by the treatment 304. In some embodiments, it may be desirable to retain the dislodged wood components, in which case the rinsing 308 can be omitted, for example, as described below with respect to FIG. 20.

After rinsing 308 (or after conclusion of treatment 304 when there is no rinsing 308), the process 300 can proceed to 310, wherein the treated piece of wood is subjected to drying. Depending on the desired application for the treated wood, it may be subject to air drying (and the attendant crumpling of lumina) or drying that substantially retains an open structure of the lumina (e.g., freeze drying or critical point drying). For example, in applications where mechanical strength may be more desirable, the air drying may result in improved flexibility and higher strength due to the crumpled and shrunken lumina. For other applications, it may be desirable to preserve the original open lattice hexagonal lumina structure, for example, for transport of species through the substrate 200. In such cases, freeze drying or critical point drying may be used.

Figure 2A:
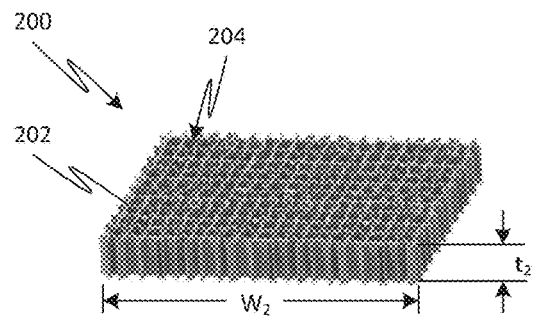
FIG. 2A is a simplified illustration of the structure of a piece of flexible wood, according to one or more embodiments of the disclosed subject matter.
Figure 2B:
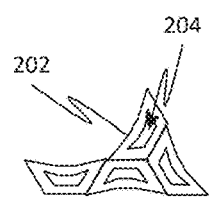
FIG. 2B is a simplified top down view of at least partially crumpled/collapsed fiber cells in the flexible wood structure, according to one or more embodiments of the disclosed subject matter.
Figure 2C:
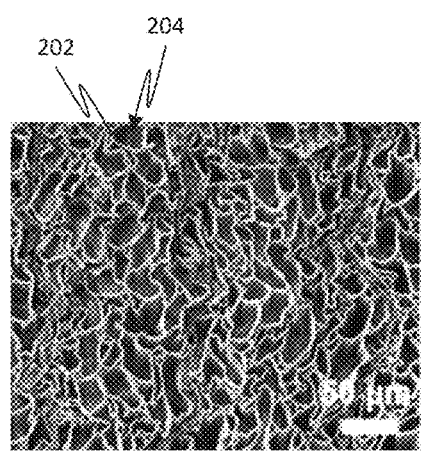
FIG. 2C is an SEM image of the cross-section of the flexible wood structure showing numerous crumpled cells, according to one or more embodiments of the disclosed subject matter.
Figure 2D:
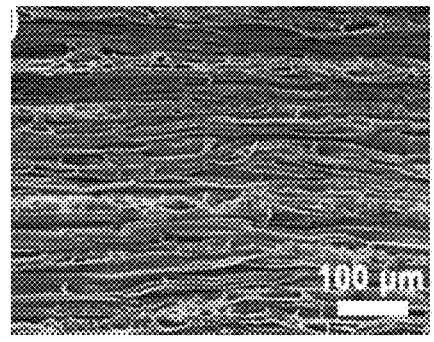
FIG. 2D is an SEM image of a longitudinal section of the flexible wood structure showing narrowed elongated lumina, according to one or more embodiments of the disclosed subject matter.

For example, FIG. 2A illustrates a piece of treated wood 200 that has been subject to air drying, and FIG. 2B illustrates a subsection of lumina 204 with crumpled cell walls 202 of the treated wood 200. After the chemical treatment 304, the multi-channeled three-dimensional porous structure of the natural wood 100 is preserved in the treated wood 200. However, the structure 200 has evolved from an open latticed hexagonal lumina 104 to crumpled lumina 204 with irregular shape and reduced cross-sectional dimension. The drying leads to the shrinkage of the cell walls 202 with closely packed cellulose nanofibers, resulting in the crumpled lumina 204. FIGS. 2C and 2D are scanning electron microscopy (SEM) images showing the morphology and microstructure of the treated wood 200.

Significant shrinkage can be observed during the drying process, primarily due to dehydration of the structure. For example, the flexible wood substrate 200 can have a weight of at least 5% less, 10% less, or about 20% less (e.g., 20.7%) than that of the natural wood 100 before the chemical treatment, and dimensions $W_2$, $t_2$, of the flexible wood substrate can decrease by at least 5%, 20%, or about 35% from respective dimensions $W_1$, $t_1$, of the natural wood 100 before the chemical treatment.

The crumpled, shrunken lumen structure can contribute to the improved mechanical properties of the chemically-treated wood substrate 200. In particular, while not wishing to be bound by any theory, the crumpled cell walls can sustain both tensile and compression forces due to the flexibility of cellulose nanofibers and extensive inter-fiber hydrogen bonds. FIG. 4A shows experimental stress-strain curves by tensile tests (with force application as illustrated in FIG. 4B) for natural wood 100 and the flexible wood substrate 200. Mechanical properties of natural wood 100 and the flexible wood substrate 200 are further reflected in Table 1 below.

As is apparent from FIG. 4A and Table 1, the mechanical tensile strength of the flexible substrate 200 is substantially improved over that of the natural wood 100 by the process 300. For example, the mechanical tensile strength of the flexible wood substrate can increase by at least 2 times, at least 5 times, or at least 7 times as compared to the mechanical tensile strength of the original natural wood.

TABLE 1

Comparison of mechanical properties for natural wood (balsa wood) and chemically treated wood

|  | Strength (MPa) | Modulus (MPa) | Toughness (MJ/m³) | Bend Radius (mm) |
|---|---|---|---|---|
| Natural Wood (100) | 0.49 | 134 | 0.001 | 5.1 |
| Treated Wood (200) | 3.29 | 116 | 0.10 | 0.06 |
| Change | 6.7x Increase | 0.86x Decrease | 100x Increase | 85x Decrease |

Figure 1E:
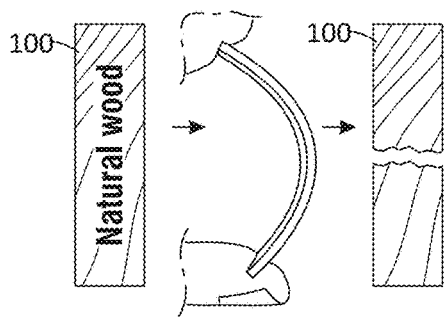
FIG. 1E are images of natural wood subjected to a bending force that leads to fracture.
Figure 2E:
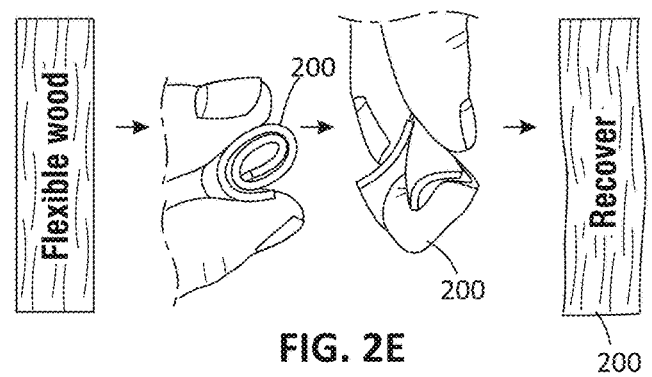
FIG. 2E are images of flexible wood subjected to a bending force without fracture, according to one or more embodiments of the disclosed subject matter.

As shown in FIG. 1E, the natural wood substrate 100 readily breaks upon bending. In contrast, one can subject the flexible wood substrate 200 to extreme bending—i.e., folding upon itself (with at least two simultaneous folds)—without breaking, as shown in FIG. 2E. Upon release of the deforming force, the flexible wood substrate 200 can return to its original state, e.g., a flat shape, without substantial defect or damage. Indeed, a relatively thick (e.g., 4 mm) flexible wood substrate 200 can be subjected to severe twisting—i.e., twists of at least 45°, or even multiple twists of at least 90°—without breaking, as shown in FIG. 2H, and can return to its original state after release.

Figure 2F:
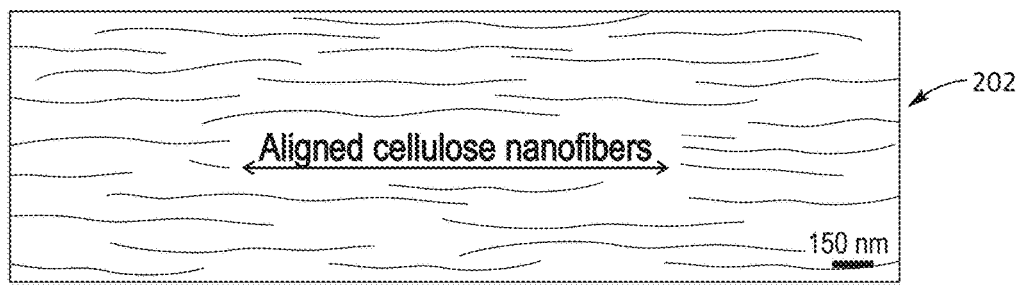
FIG. 2F is a magnified SEM image showing the aligned cellulose nanofibers in the flexible wood structure, according to one or more embodiments of the disclosed subject matter.

After partially removing the hemicellulose and lignin by chemical treatment, the cellulose nanofibers forming walls 202 remain aligned, as shows in FIG. 2F, but nanopores can be introduced between the cellulose nanofibers, thereby increasing the softness and flexibility of the channel walls 202. For example, the modulus of the flexible wood substrate 200 can decrease by at least 10%, such as from 134 MPa to 116 MPa, as compared to the modulus of the original natural wood 100. Moreover, the alignment of cellulose nanofibers may enable the flexible wood substrate 200 to have anisotropic properties.

Figure 2G:
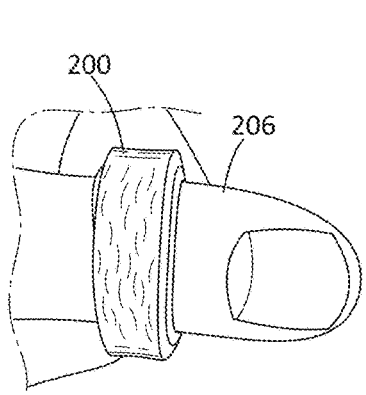
FIG. 2G is an image showing flexible wood wrapped around a finger without fracture, according to one or more embodiments of the disclosed subject matter.
Figure 2H:
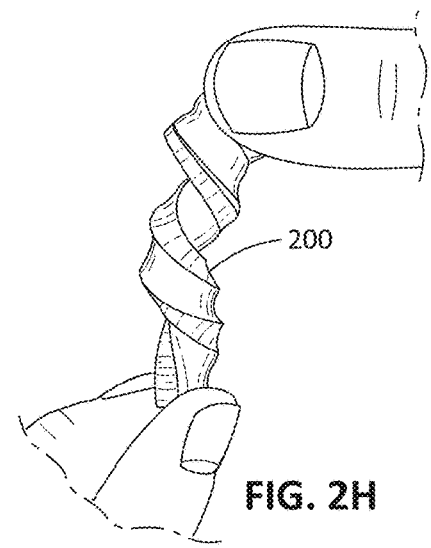
FIG. 2H is an image showing flexible wood subjected to extreme twisting without fracture, according to one or more embodiments of the disclosed subject matter.
Figure 2I:
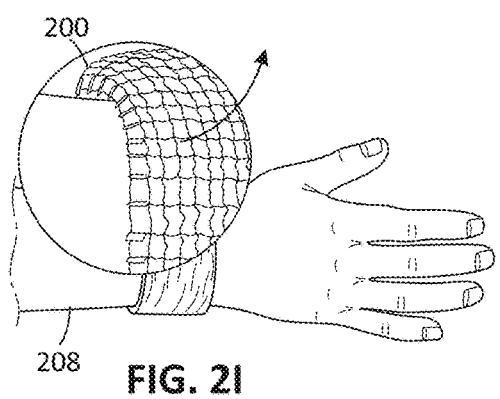
FIG. 2I is an illustration of flexible wood wrapped around an appendage (wrist) for use in wearable applications, according to one or more embodiments of the disclosed subject matter.
Figure 2J:
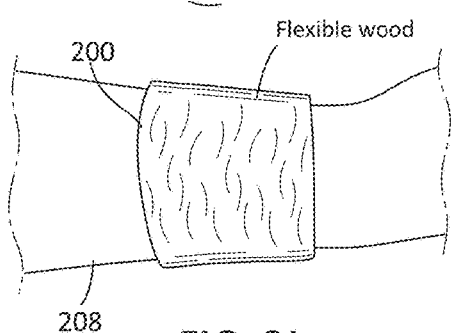
FIG. 2J is an image showing flexible wood wrapped around an appendage without fracture, according to one or more embodiments of the disclosed subject matter.

The superior flexible nature of the flexible wood substrate 200 allows the substrate to be adapted to a variety of different shapes and configurations. For example, the substrate 200 can be deformed to be worn by a user for a wearable device. In such a configuration, the substrate 200 can be wrapped around an appendage of a user, for example, a finger 206 as shown in FIG. 2G or a wrist 208 as shown in FIGS. 2I-2J, or any other body part.

Moreover, the flexible wood shows excellent durability after undergoing 1000 bending cycles, suggesting outstanding structural stability in bending. For example, the bend radius of the flexible wood substrate 200 can decrease by at least 2 times, at least 10 times, or at least 50 times as compared to the bending radius of the original natural wood 100. For example, the bend radius of the natural wood substrate 100 can be 5.1 mm (i.e., curvature of 0.195 mm$^{-1}$) while the bend radius of the flexible wood substrate 200 can be 0.06 mm (i.e., curvature of 16.7 mm$^{-1}$), as shown in Table 1. Unlike conventional wood structures that have grooves cut into their surface to increase their flexibility, the flexible wood substrate can be considered a monolithic piece, with substantially continuous flat top and bottom surfaces.

Figure 5A:
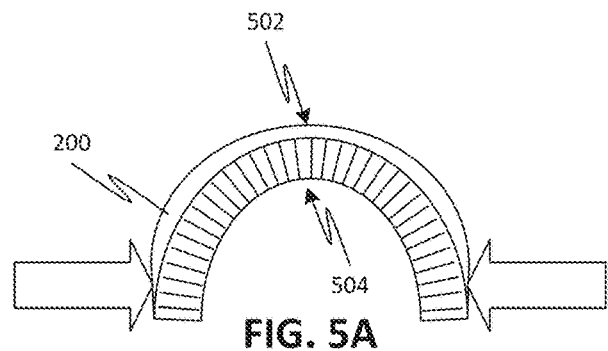
FIG. 5A is a simplified schematic of the flexible wood structure of FIG. 2A subjected to bending.
Figure 5B:
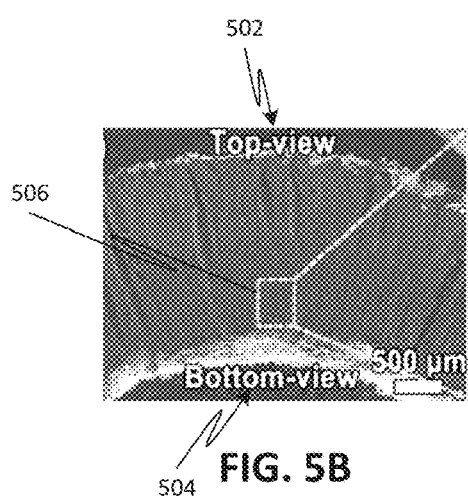
FIG. 5B is an SEM image of a cross-section of the flexible wood structure in bending, according to one or more embodiments of the disclosed subject matter.
Figure 5C:
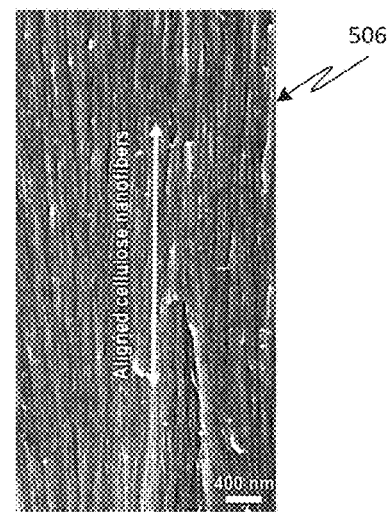
FIG. 5C is a magnified SEM image of region 506 in FIG. 5B, illustrating aligned cellulose nanofibers, according to one or more embodiments of the disclosed subject matter.
Figure 5D:
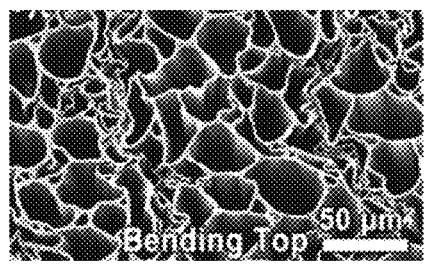
FIG. 5D is an SEM image from a top view (502) of the flexible wood structure in bending, according to one or more embodiments of the disclosed subject matter.

As noted above, the unique crumpled lumina may be beneficial to the flexibility of the flexible wood substrate 200. When subjected to a bending force as illustrated in FIG. 5A, the top side 502 of the flexible wood substrate 200 will sustain tension force while the bottom side 504 sustains compression force. As a result, the top side 502 of the lumina 204 will expand whereas the bottom side 504 of the lumina shrinks, resulting in multiple cone-shaped channels. FIG. 5D shows a top view SEM image of the bent flexible wood substrate 200, where the upper parts of the lumina are more open than in their original state. The crumpled cell walls in the unbent flexible wood substrate 200 are partially straightened due to the tension induced by the bending, at least partially returning to a hexagonal cell shape similar to the natural wood 100 prior to chemical treatment.

Figure 5E:
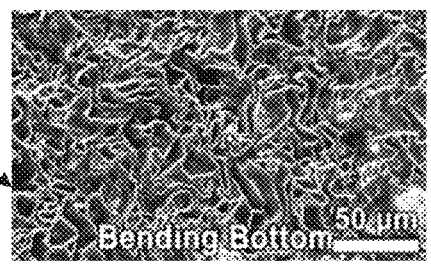
FIG. 5E is an SEM image from a bottom view (504) of the flexible wood structure in bending, according to one or more embodiments of the disclosed subject matter.
Figure 5F:
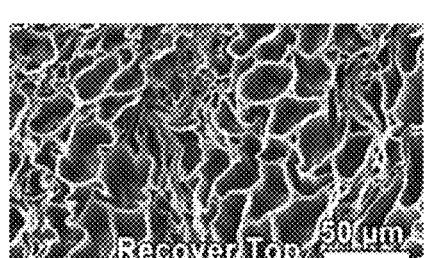
FIG. 5F is an SEM image from the top view (502) of the flexible wood structure after release from bending, according to one or more embodiments of the disclosed subject matter.
Figure 5G:
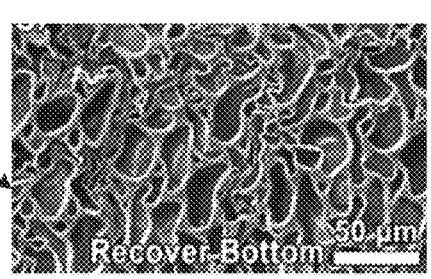
FIG. 5G is an SEM image from the bottom view (504) of the flexible wood structure after release from bending, according to one or more embodiments of the disclosed subject matter.

In contrast, FIG. 5E shows a bottom view SEM image of the bent flexible wood substrate 200, where the bottom parts of the lumina are heavily compressed so as to be almost closed and with more severe curving of cell walls. Yet, the cellulose nanofibers are maintained in alignment, with smaller gaps due to the compression of the bottom part, as shown in FIGS. 5B-5C. When released, the flexible wood can fully recover its original shape without any noticeable damage to the underlying structure. As illustrated in FIGS. 5F and 5G, respectively, the top and bottom part of the lumina revert to their original crumpled state, indicative of the structural recovery capability of the flexible wood substrate 200.

Returning to FIG. 3, after the drying 310, the flexible wood substrate 200 can optionally be modified for use in a particular application at 312. Thus, 312 can include adding materials to the flexible wood substrate 200, for example, by coupling to exterior or interior surfaces thereof, in order to add functionality that the flexible wood substrate 200 (or the original natural wood 100) otherwise lacks, while still benefiting from the improved mechanical characteristics offered by the treatment 304. The addition of materials to the flexible wood substrate 200 can in effect form a hybrid structure of wood and non-native (e.g., non-wood or wood cells of a different species) materials specifically adapted to a particular application.

For example, modification 312 can include applying a coating to external surfaces and/or internal surfaces of the flexible wood substrate 200, or coupling particles to the external surfaces and/or internal surfaces of the flexible wood substrate 200. The coating, or the coupled particles, can include a conductive material, a semiconductive material, or an insulating material. For example, the coating, or the coupled particles, can include at least one of nanoparticles, nanowires, graphene, graphite, single-walled carbon nanotubes (CNTs), double-walled CNTs, multi-walled CNTs, polyaniline, and carbon black.

In some embodiments, the coating, or the coupled particles, can be a solar or radiation absorptive material, such as, but not limited to, CNTs, carbon black, graphite, hard carbon, reduced graphene oxide, or graphene. In some embodiments, the coating, or the coupled particles, can include plasmonic metallic nanoparticles, catalytic nanoparticles, or electroactive nanoparticles. Examples of materials for the plasmonic metallic nanoparticles include but are not limited to Au, Pt, Ag, Pd, and Ru.

In some embodiments, the coating, or the coupled particles, can include at least one of metallic nanoparticles, metal alloy nanoparticles, semiconductor nanoparticles, sulfides, phosphides, borides, and oxides. The metallic nanoparticles and the metal alloy nanoparticles can include, but are not limited to, Pt, Pd, Au, Ag, Ni, Co, Ru, and Fe. Examples of materials for the semiconductor nanoparticles include $CuFeSe_2$ or any other semiconductor. Examples of materials for the sulfides include, but are not limited to, $MoS_2$, $CoS_x$, and $FeS_2$, where x is an integer. Examples of materials for the phosphides include, but are not limited to, $CoP$, $NiP_2$, and $MoP_x$, where x is an integer. Examples of materials for the borides include, but are not limited to, CoB, MoB, and NiB. Examples of materials for the oxides include, but are not limited to, $MnO_2$, $Fe_2O_3$, CoO, and NiO.

As such, the flexible wood substrate 200 can be adapted at 312 for a wide variety of uses at 314. Examples of such uses 314 include, but are not limited to, building (construction) or structural materials, biological scaffolds for tissue engineering, biocompatible/biodegradable or implantable structures, steam or vapor generation devices or distillation systems, energy storage devices, flexible conductors, flexible electronic devices, wearable devices, and shape memory structures. While the following discussion details adaptation of the flexible wood substrate 200 for specific use examples, embodiments of the disclosed subject matter are not limited thereto. Indeed, one of ordinary skill in the art will appreciate that the flexible wood substrate 200 can be readily adapted to other uses beyond those explicitly discussed herein through application of the teachings of the present disclosure.

As noted above, the flexible wood substrate 200 has a unique three-dimensional porous structure with numerous channels and excellent breathability, biodegradability and biocompatibility by virtue of the cellulose-based structure of the natural wood 100 precursor, while enjoying increased flexibility as a result of the partial lignin and hemicellulose removal. In addition, the multiple direct micro-channels and nano-channels in the substrate can be beneficial to nutrient transportation and metabolic byproduct removal. These properties contribute to biocompatibility and efficient cell adhesion of non-wood cells (e.g., human or animal cells) that allow the flexible wood substrate to act as three-dimensional cell carriers or biological scaffold for tissue engineering. Thus, in one embodiment, the flexible wood substrate serves a biological scaffold.

Figure 6A:
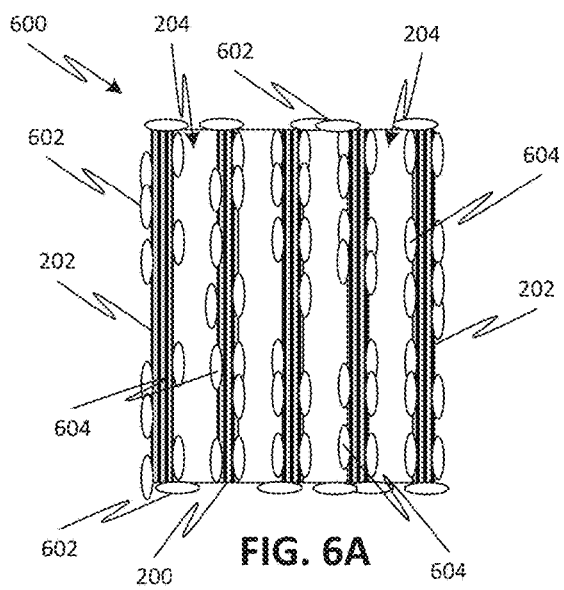
FIG. 6A is a simplified schematic diagram of a cross-section of a flexible wood structure as a biological scaffold, according to one or more embodiments of the disclosed subject matter.
Figure 6B:
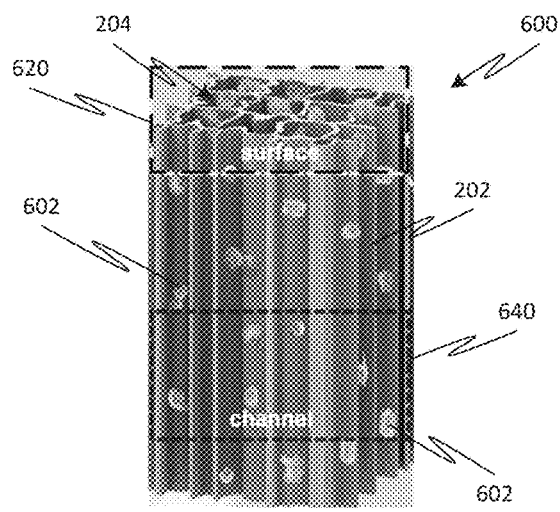
FIG. 6B is a simplified isometric illustration of a flexible wood structure as a biological scaffold, according to one or more embodiments of the disclosed subject matter.

FIG. 6A shows an embodiment of a biological scaffold 600 incorporating the flexible wood substrate 200. One or more cells 602 can adhere to an external surface of the substrate 200. Additionally or alternatively, one or more cells 604 can adhere to internal surfaces of the substrate 200, i.e., the cellulose-based cell walls 202 defining the lumina 204. In generally, the cells 602, 604 are non-wood cells, such as human or animal cells. For example, successful attachment of human embryonic kidney (HEK) 293 cells have been demonstrated on a flexible wood substrate 200, as illustrated in FIGS. 6B-6F.

Figure 6C:
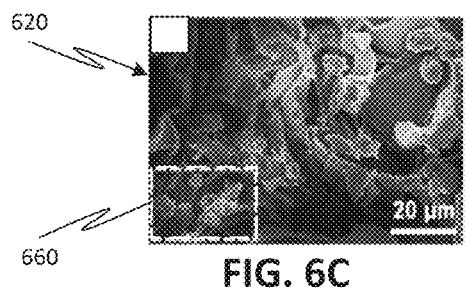
FIG. 6C is an SEM image of HEK293 cells cultured on a surface of the flexible wood biological scaffold, according to one or more embodiments of the disclosed subject matter.
Figure 6D:
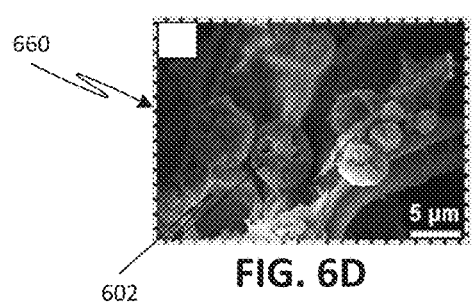
FIG. 6D is a magnified SEM image of region 660 in FIG. 6C.
Figure 6E:
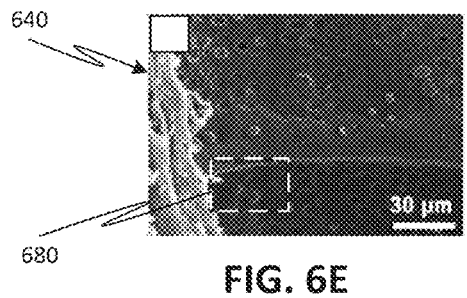
FIG. 6E is an SEM image of HEK293 cells cultured on surfaces within lumina of the flexible wood biological scaffold, according to one or more embodiments of the disclosed subject matter.
Figure 6F:
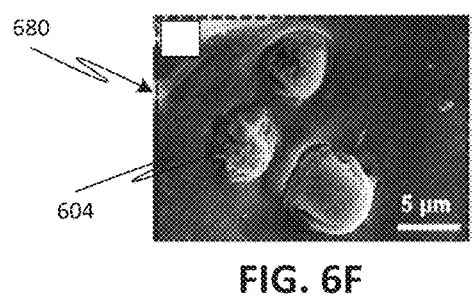
FIG. 6F is a magnified SEM image of region 680 in FIG. 6E.

In particular, FIGS. 6C and 6D are SEM images of a top of a flexible wood substrate 200, showing the formation of HEK293 cells 602 on the surface thereof, with FIG. 6D being a magnified view of region 660 in FIG. 6C. FIGS. 6E and 6F are SEM images of a longitudinal section of the flexible wood substrate 200, showing infiltration and attachment of the HEK293 cells 604 within the lumina 204 of the substrate 200, with FIG. 6F being a magnified view of region 680 of FIG. 6E. Thus, efficient three-dimensional adhesion and proliferation of non-wood cells in the flexible wood substrate can be realized, which is a necessary step in applications for three-dimensional bio-scaffolding and tissue engineering.

The culturing of the non-wood cells in the flexible wood substrate does not substantially affect the beneficial mechanical properties of the substrate. Thus, the flexibility of the flexible wood substrate is maintained. Repeated bending of the substrate does not affect adherence of the HEK293 thereto, indicating a highly stable and sufficient attachment property.

Figure 7:
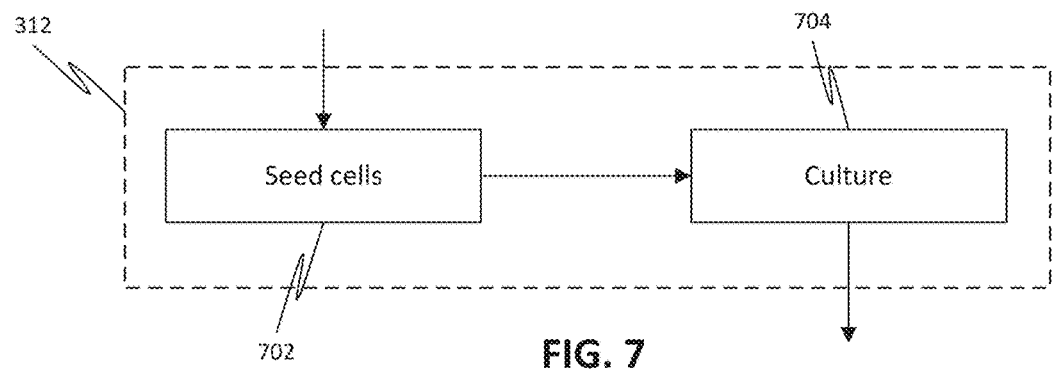
FIG. 7 is a simplified process flow for modification 312 of FIG. 3 for forming a flexible wood biological scaffold, according to one or more embodiments of the disclosed subject matter.

FIG. 7 shows a simplified process flow for the modification 312 of FIG. 3 when the flexible wood substrate 200 is used as a biological scaffold. For example, modification 312 can include, at 702, seeding a plurality of the non-wood cells on the flexible wood substrate 200. After the seeding 702, the modification 312 can proceed to culturing the non-wood cells at 704. Culturing 704 can include transporting nutrients to the non-wood cells and metabolic byproducts from the non-wood cells via the preserved cellulose-based structures of the flexible wood substrate 200, e.g., the partially collapsed lumina 204 and/or nanochannels between cellulose nanofibers within cell walls 202. The culturing 704 may form a cell population, cell culture, or at least part of a tissue. After 704, the biological scaffold 600 may then be subject to use at 314 in FIG. 3. Such use can include, but is not limited to, further culturing or implanting of the formed population or tissue into a patient, which may be a human or animal.

Figure 8A:
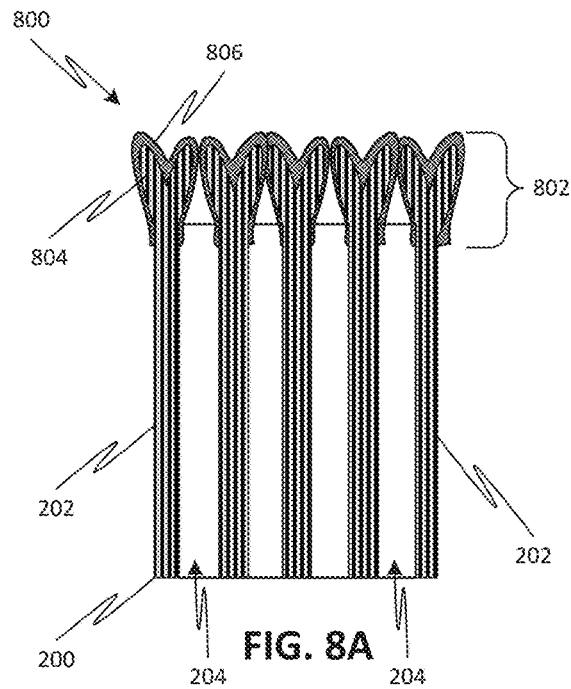
FIG. 8A is a simplified schematic diagram of a cross-section of a flexible wood structure as a vapor generation device, according to one or more embodiments of the disclosed subject matter.

In another embodiment, a coating can be added to at least one surface of the flexible wood substrate 200 in order to form a hybrid structure. FIG. 8A illustrates an embodiment of hybrid device 800, where a top surface region 802 of flexible wood substrate 200 has been provided with a coating 806. In some embodiments, the top surface region 802 may be further modified to include a particular surface geometry, such as protrusions or microsheets 804, as illustrated in FIG. 8A. Depending on the application, the coating 806 can be a radiation absorbing coating, a radiation reflective coating, an electrically or thermally conductive coating, a semiconductive coating, or an electrically or thermally insulating coating.

For example, the hybrid device 800 can be configured as a vapor generation device, as illustrated in FIGS. 8B-8E. As described above, the natural wood structure is subjected to treatment with a chemical solution to partially remove lignin and hemicellulose, thereby resulting in a flexible wood substrate 200 suitable for portable applications such as the vapor generation device. The resulting composition of an exemplary flexible wood substrate 200 is reflected below in Table 2. As noted above, the chemically treated substrate can be subject to freeze drying (e.g., for 2 days) or critical point drying in order to maintain an unblocked structure for the lumina.

TABLE 2

Composition of natural wood and resulting treated wood for use in vapor generation

|  | Cellulose | Hemicellulose | Lignin |
| --- | --- | --- | --- |
| Natural Wood (100) | 40.0% | 15.9% | 24.0% |
| Treated Wood (200) | 37.6% | 11.6% | 19.8% |

Figure 8B:
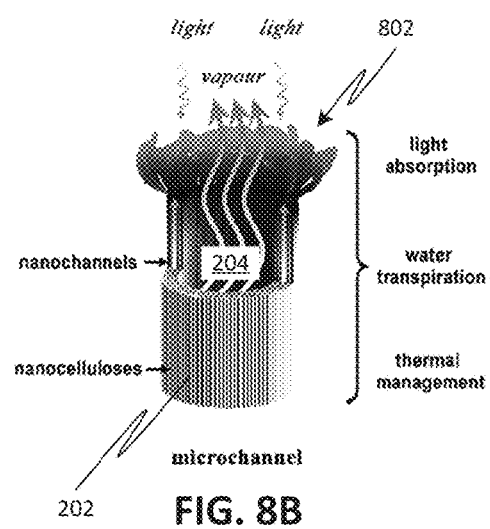
FIG. 8B is a simplified cutaway illustration of an individual cell in the flexible wood structure as vapor generation device, according to one or more embodiments of the disclosed subject matter.

The flexible wood substrate 200 can be further modified to optimize it for vapor generation. For example, prior to the chemical treatment, the natural wood 100 can be cut to create a rough flower-like surface 802 with numerous flower-like microsheets 804, as illustrated in FIGS. 8A-8B. For example, the cut can be performed with an electric saw. The microsheets 804 increase the surface area and elongate the optical path for multiple scattering, thereby enhancing the light absorbability. In addition, at least the rough surface with the microsheets 804 is coated with a light absorbing coating 806 to improve the photothermal conversion efficiency.

In the example discussed below, the light absorbing coating 806 comprises CNTs. However, embodiments of the disclosed subject matter are not limited thereto and other materials can be used for the light absorbing coating 806. Moreover, in the example discussed below, the fluid is water and the resulting vapor is steam. However, embodiments of the disclosed subject matter are not limited thereto and other fluids are also possible according to one or more contemplated embodiments. Similarly, although solar illumination is discussed as the radiation source in the example below, other radiation sources are also possible according to one or more contemplated embodiments.

Figure 8C:
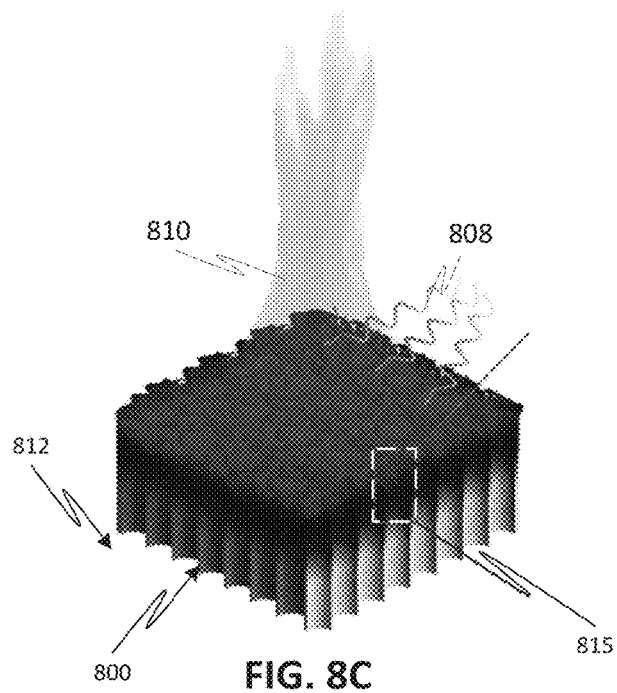
FIG. 8C is a simplified isometric illustration of the flexible wood structure as vapor generation device, according to one or more embodiments of the disclosed subject matter.
Figure 8D:
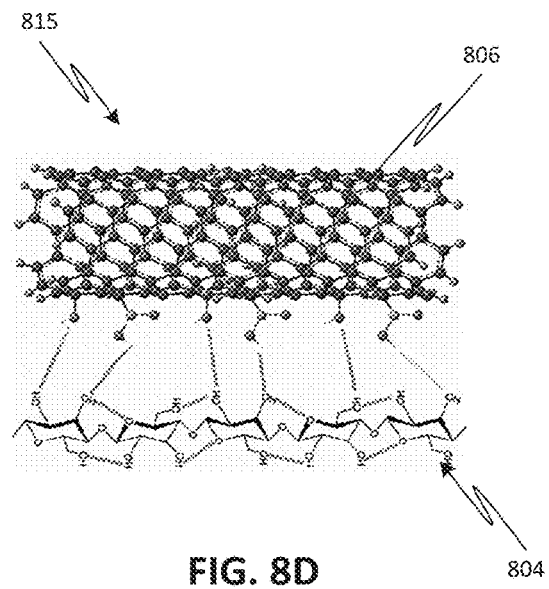
FIG. 8D is a magnified view illustrating a simplified structure of carbon-nanotube coating on microsheet surfaces of the flexible wood structure as vapor generation device, according to one or more embodiments of the disclosed subject matter.

In a fabricated example, the mass percentage of the coating 806 of the CNTs was as low as 0.3-0.5 wt %. The flower-like surface was uniformly coated with a layer 806 of CNTs, while the inside channels 204 remained smooth without CNT coating. Strong interactions and connections between CNTs and the wood matrix of the substrate 200 result from the abundant —OH and —COOH groups on the surface of the CNTs and —OH groups on the cellulose, as illustrated in FIG. 8D. The CNT coating 806 of the flexible wood substrate 200 does not substantially affect the beneficial mechanical properties of the substrate 200. Thus, the flexibility of the flexible wood substrate 200 is maintained. Repeated bending of the substrate 200 does not affect adherence of the coating 806 thereto, indicating a highly stable and sufficient attachment property.

In the fabricated example, the carbon nanotube (CNT) coated black and flower-like surface 802 of the flexible wood substrate 200 with large surface area can maximize the light absorption by elongating the optical path for multiple scattering and thereby promote photothermal conversion. FIGS. 8C-8D illustrate an example of a vapor generation device 800, where FIG. 8D is a magnified view of region 815 in FIG. 8C, illustrating the coupling between the CNT coating and the surface of the flexible wood substrate 200.

Thermal losses can be minimized by localizing the photothermal generation at the water-air interface 812 with the thermally insulating wood matrix 202, in particular by restricting the coating 806 to an upper region of the device 800. The chemically treated wood itself is also a good thermal insulator, such that the majority of the generated heat will be localized at the top surface 802 of the substrate 200. Due to its relatively low density, the device 800 can float on the water, such that interface 812 can be formed between the water and the substrate 200 closer to the top surface 802 than the bottom, e.g., near the CNT coating 806.

As illustrated in FIG. 8C, when the sunlight 808 illuminates the vapor generation device 800, the rough coated flower-like surface 802 will absorb the sunlight 808 and generate localized heating at the fluid-air interface 812. As a result, the local temperature increases and evaporates the fluid. The resulting vapor 810 escapes to the atmosphere, or can be captured for distillation purposes (e.g., converting salt water to freshwater, or converting contaminated water to potable water).

Figure 8E:
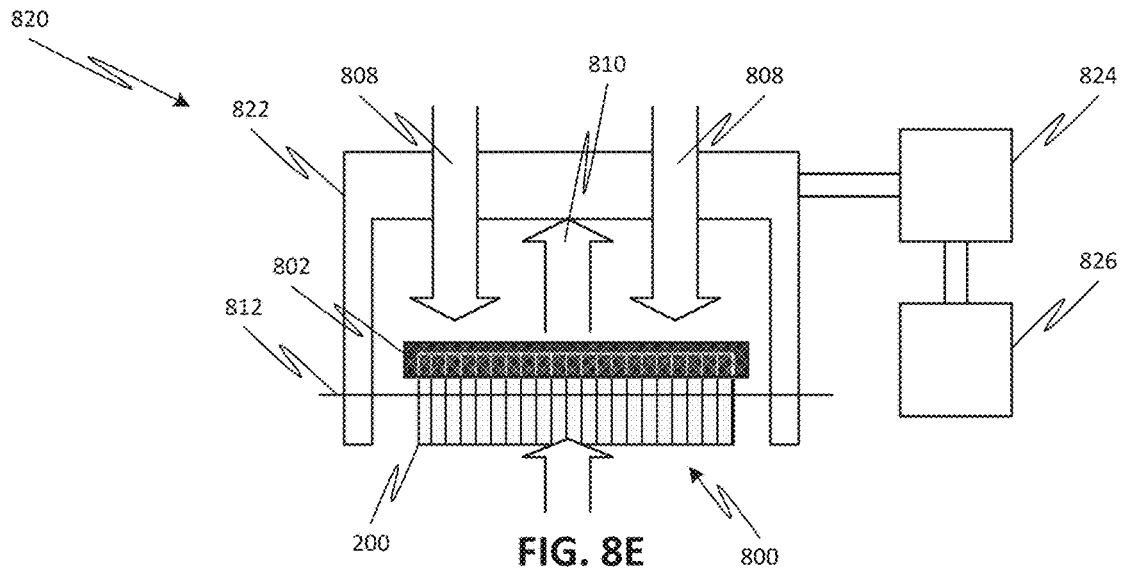
FIG. 8E is a simplified schematic diagram of a solar thermal distillation device including a flexible wood vapor generation device, according to one or more embodiments of the disclosed subject matter.

For example, as illustrated in FIG. 8E, a distillation device 820 including the vapor generation device 800 can use a capture hood 822 to capture the generated vapor 810. The capture hood 822 may be constructed to allow solar radiation 808 to pass therethrough to the vapor generation device 800. Optionally, the capture hood 822 can include focusing optics to increase an intensity of the radiation 808 incident on the absorbing surface 802 of the vapor generation device 800. The captured vapor can be directed to a condenser 824 to convert the vapor back to a fluid, which can then be stored in a container 826 for later or immediate use.

Returning to FIGS. 8B-8C, as the water proximal to the upper surface 802 continuously evaporates, water from the bottom of the flexible wood substrate 200 will simultaneously be pumped through the substrate 200, via vessels and other natural interconnected channels in the wood such as connected lumen 204. In particular, the negative pressure at the top of the substrate 200 induces capillary forces within the substrate channels that have smaller diameters than vessels, thereby moving fluid to the top 802 of the substrate 200.

Treatment of the natural wood with the chemical solution can break some tracheid cell walls to form large microchannels through connecting adjacent cell lumen 204, both vertically and tangentially, for potentially transpiring water. There also exist nanopores (i.e., nanochannels) between the aligned cellulose fibrils of walls 202 due to the partial removal of hemicellulose and lignin, which can improve the water transpiration capability of the wood matrix through capillarity. These characteristics of the flexible wood substrate 200 ensure a continuous supply of water for evaporation, without requiring a separate pumping mechanism. Thus, fluid can be passively pumped to the top heated surface 802 from the opposing bottom surface, which may be disposed on or in a body of the fluid, via capillary action and/or nano-cavitation effects.

Figure 8F:
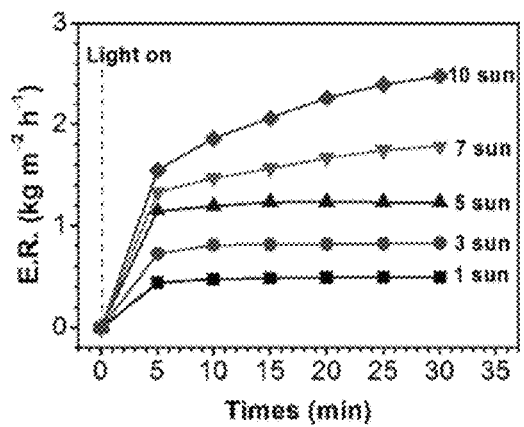
FIG. 8F is a graph of steam generation performance of a flexible wood vapor generation device under different solar concentrations, according to one or more embodiments of the disclosed subject matter.
Figure 8G:
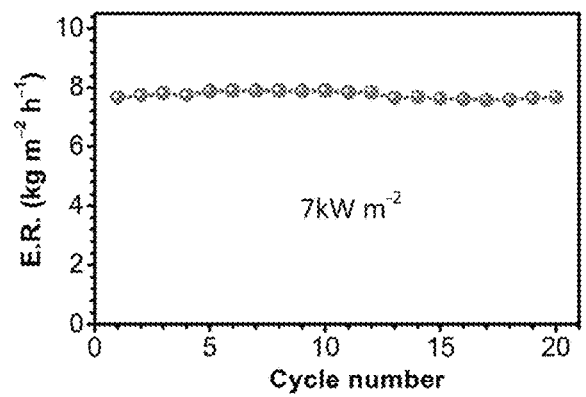
FIG. 8G is a graph of cycling performance of the flexible wood vapor generation device under a solar concentration of 7 sun, according to one or more embodiments of the disclosed subject matter.

The CNT-coated 806 flexible wood substrate 200 with a flower-like surface and multichannels along the tree-growth direction was evaluated using a solar simulator as a light source, the vapor generator 800 as a light absorber, and a beaker with water as fluid source. Upon irradiation, the temperature of the surface of the substrate 200 rapidly increased due to the local heat generation. Steam is thus generated and increases as the radiation intensity increases. The resulting evaporation rate (E.R.) as a function of time is shown in FIG. 8F. As is apparent, each curve shows an evaporation rate that increases rapidly within the initial 5 minutes, and then slowly reaches a maximum value. By virtue of the above noted optimization of light absorption, thermal management, fluid transportation, and evaporation, a steam generation device 800 based on the flexible wood substrate 200 can demonstrate a remarkably high efficiency (e.g., at least 60% at 10 kW/m$^2$ or at least 80% at 10 kW/m$^2$). As shown in FIG. 8G, the steam generation device employing the flexible wood substrate exhibits stable evaporation rates for 20 cycles.

Figure 9:
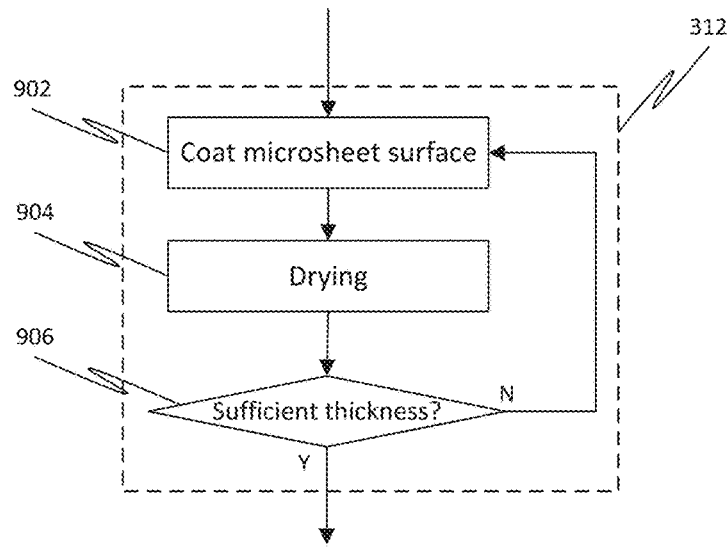
FIG. 9 is a simplified process flow for modification 312 of FIG. 3 for forming a flexible wood vapor generation device, according to one or more embodiments of the disclosed subject matter.

FIG. 9 shows a simplified process flow for the modification 312 of FIG. 3 when the flexible wood substrate 200 is used in a vapor generation device 800. For example, modification 312 can include, at 902, coating at least the microsheet surface 804 of the vapor generation device 800. When the coating comprises CNTs, a CNT powder can be dispersed in a solvent such as acetone to make a CNT solution. The flexible wood substrate 200, or at least an upper surface 804 thereof, can be immersed into the CNT solution. During the immersion, the CNT solution and/or the substrate 200 may optionally be sonicated. Factors affecting the coating include the thickness of the substrate 200 and immersion time. If the thickness of the substrate is relatively large (as when the substrate 200 is used in the vapor generation device 800) the infiltration of the CNTs into the channels 204 is comparatively more difficult. Moreover, the immersion and/or sonication time may be relatively short to further inhibit CNT penetration into the channels 204.

The substrate 200 can then be removed from the solution and allowed to air dry 904 in order to build a layer of CNTs. The coating 902 and drying 904 can be repeated at 906 to build the coating layer by layer on the surface of the flexible substrate 200. One of ordinary skill in the art will appreciate that other coating processes for modification 312, as applied to a vapor generation device or any other device incorporating the flexible wood substrate, would be applicable to different coating materials and are within the scope of the disclosed subject matter.

In another embodiment, a coating can be added to at least a top surface and interior surfaces of the cell walls 202 that form the lumina 204 of the flexible wood structure in order to form another hybrid structure. FIG. 10A illustrates an embodiment of hybrid device 1000, where both a top surface region 1008 and surfaces of walls 202 of the flexible wood substrate 200 have been provided with a coating 1004. In some embodiments, the top surface region 1008 may be further modified to include a particular surface geometry, such as protrusions or microsheets 804, as illustrated in FIG. 10A. Depending on the application, the coating 1004 can be a radiation absorbing coating, a radiation reflective coating, an electrically or thermally conductive coating, a semiconductive coating, or an electrically or thermally insulating coating.

Alternatively or additionally, one or more non-wood particles 1006 can be coupled to surfaces of the flexible substrate 200, either directly to the wood surface or through coating 1006 when available. For example, depending on the application, the particles 1006 can be catalytic nanoparticles, electroactive nanoparticles, plasmonic metallic nanoparticles, semiconductor nanoparticles, metallic or metal alloy nanoparticles, sulfides, phosphides, borides, or oxides, among other materials.

For example, the hybrid device 1000 can be configured as an energy storage device, i.e., a battery cell, as illustrated in FIGS. 10B-12B. As described above, the natural wood structure is subjected to treatment with a chemical solution to partially remove lignin and hemicellulose, thereby resulting in a flexible wood substrate 200 suitable for portable applications such as the battery cell. As also noted above, the chemically treated substrate can be subject to freeze drying (e.g., for 2 days) or critical point drying in order to maintain an open structure for the lumina 204.

When configured as a battery cell 1000, the hybrid device can further include a separator membrane 1010 that separates an anode 1012 from the flexible substrate 200, which acts as a cathode 1002 and current collector. The flexible substrate 200 can have surfaces coated by an electrically conductive coating 1004. A housing 1018 may enclose the anode 1012, cathode 1002, and separator membrane 1010. An appropriate electrolyte fluid may fill the nanochannels of cell wall 202 without obstructing the open spaces of lumina 204. In a charging state, electrons may flow in direction 1016 from cathode 1002 through power supply/load 1019 to the anode 1012, whereas electrons may flow in the opposite direction 1014 in a discharging state.

In the example discussed below, the electrically conductive coating 1004 comprises CNTs. However, embodiments of the disclosed subject matter are not limited thereto and other materials can be used for the electrically conductive coating 806. Moreover, in the example discussed below, the battery is configured as a Li—$O_2$ battery, with the anode 1012 being a Li foil. However, embodiments of the disclosed subject matter are not limited thereto and other battery cell compositions are also possible according to one or more contemplated embodiments. Similarly, although Ru nanoparticles are discussed as the particles 1006 coupled to the flexible substrate 200 via coating 1004, other particles (whether macro-, micro-, or nano-particles) are also possible according to one or more contemplated embodiments.

For example, coating 1004 on the top surface and within channels 204 of the flexible substrate 200 can include CNTs, which may couple to the surface of the cell walls 202 by electrostatic interaction between the cellulose and the CNTs. As illustrated in FIGS. 10D and 10E, respectively, both the flower-like rough surface 1008 with numerous microsheets and the multi-channeled structure (e.g., including bigger vessels and smaller lumina 204) can be preserved through the chemical treatment to partially remove lignin and hemicellulose and the subsequent coating with CNTs.

In a battery cell embodiment 1000 employing the flexible wood substrate 200, the battery operation takes advantage of noncompetitive and continuous pathways offered by the structure of the coated flexible substrate for transport of ions, gas, and electrons. For example, the cellulose nanofiber cell wall 202 has abundant nanopores 1021 between the nanofibers 1020, which can be used to transport ions 1026 (e.g., $Li^+$ ions) when soaked with moderate amount of electrolyte, as illustrated in FIG. 10C. The wood lumina 204 and vessels (i.e., channels) can act as the continuous transport pathway for gas 1024 (e.g., $O_2$), as illustrated in FIG. 10B. With a small amount of catalytic particles 1006 (e.g., ruthenium (Ru)) loaded onto the surface of the coating 1004, the substrate 200 can serve as both cathode and current collector. The catalytic particles 1006 on the surface of the coating 1004 can be beneficial to the redox reaction involving oxygen reduction and evolution, which can work with the other benefits of the flexible substrate 200 to achieve a high electrochemical performance with both high capacity and long cycling life.

For example, the battery cell 1000 is formed with the modified flexible substrate 200 as a current collector-free cathode, a glass fiber membrane as separator 1010, and a lithium foil as anode 1012. Moderate amount of liquid electrolyte (e.g., 1M LiTFSI/TEGDME electrolyte) can be added to the battery cell to ensure that sufficient electrolyte permeated the cellulose nanofiber walls 202 of the substrate 200, so as to form a continuous pathway for ion transport, but without extra electrolyte that would otherwise flood the channels 204. The open channels 204 also provide sufficient space for growth of $Li_2O_2$ product without substantially obstructing the flow of oxygen gas in the channels 204. The rough flower-like surface 1008 and abundant pores with uniform loading of catalytic nanoparticles 1004 provides plenty of active sites for redox reactions.

Moreover, the flexible substrate 200 maintains its excellent mechanical properties, allowing the resulting battery 1000 to be manipulated or deformed without negatively impacting performance or reliability. For example, battery cells incorporating the modified flexible substrate can be subjected to bending, folding, rolling, twisting, etc. without apparent degradation in performance or stability and can revert to their original shape after manipulation. For example, the battery cell can be folded for 1440° or rolled completely upon itself without degradation in performance. Accordingly, the battery incorporating the flexible substrate 200 may be particularly useful in applications for wearable and portable electronics.

Figure 11A:
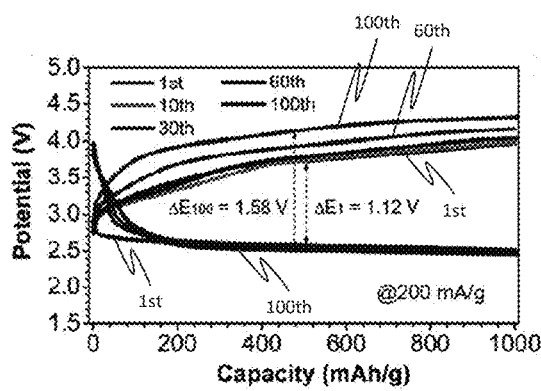
FIG. 11A is a graph illustrating charge-discharge profiles at 200 mA/g for various cycles of the flexible wood structure as Li—$O_2$ battery, according to one or more embodiments of the disclosed subject matter.
Figure 11B:
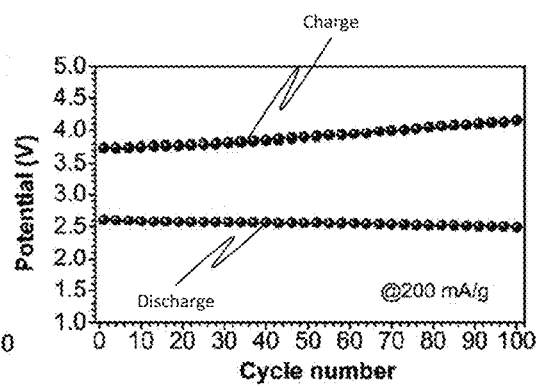
FIG. 11B is a graph illustrating average charge and discharged potentials over an initial 100 cycles at 200 mA/g for the flexible wood structure as Li—$O_2$ battery, according to one or more embodiments of the disclosed subject matter.

Due to the underlying wood structure and the design of the battery cell, the modified flexible wood substrate 200 demonstrates a high capacity of over 7000 mAh/g, a long cycling life of 100 cycles with a restricted capacity of 1000 mAh/g at 200 mA/g, and superior electrochemical and mechanical stability. FIG. 11A shows the galvanostatic discharge-charge voltage profiles with a restricted capacity of 1000 mAh/g at a current density of 200 mA/g, for selected cycles of 1st, $10^{th}$, $30^{th}$, $60^{th}$, and $100^{th}$ (although only $1^{st}$, $60^{th}$, and $100^{th}$ are labeled for clarity). The battery cell 1000 demonstrates a relatively low overpotential of 1.12V in the first cycle, which remains relatively stable for nearly 60 cycles, as reflected in FIG. 11B. After 60 cycles, there is a slight increase in overpotential, eventually reaching 1.58V at 100 cycles. While not wishing to be bound by any theory, the increase of overpotential may be due to the decomposition of electrolyte during the repeated charge/discharge processes.

Figure 12A:
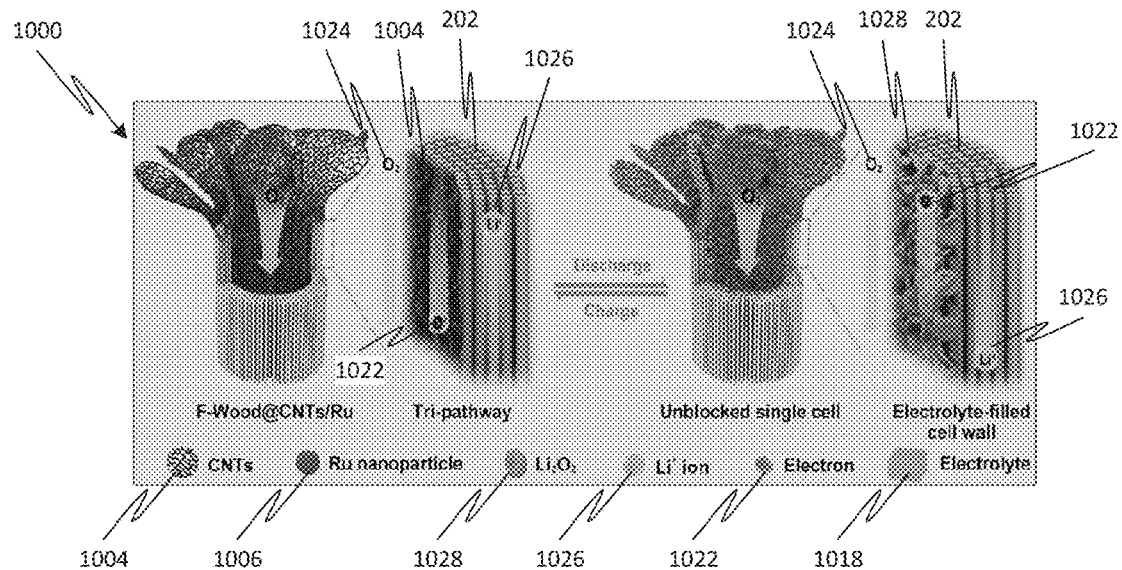
FIG. 12A is a simplified illustration of discharge-charge reactions of a single cell of the flexible wood structure as Li—$O_2$ battery, according to one or more embodiments of the disclosed subject matter.
Figure 12B:
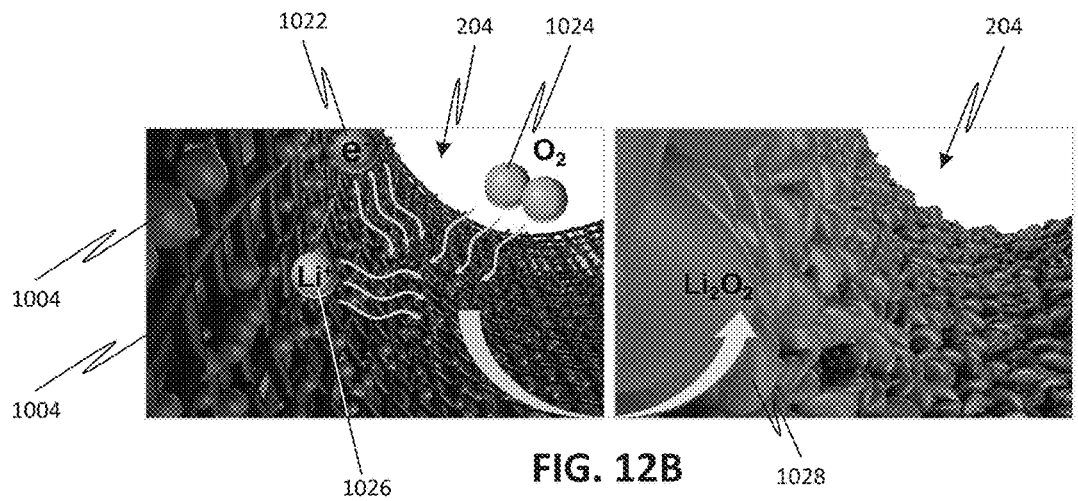
FIG. 12B is a simplified illustration of the reversible electrochemical reactions occurring at the tri-phase interface of the flexible wood structure as Li—$O_2$ battery, according to one or more embodiments of the disclosed subject matter.

The excellent electrochemical performance of the modified flexible substrate can be attributed to the noncompetitive and continuous tri-pathway structure. FIGS. 12A-12B graphically illustrate this breathable tri-phase redox reaction process involving electrons, $Li^+$ ions, and $O_2$ gas, and their transport in the modified flexible substrate. The reversible electrochemical reactions occurring in the tri-phase interface involve noncompetitive and continuous tri-pathways: (1) $Li^+$ ions 1026 are transported along a first pathway formed by the electrolyte-filled cell walls 202 (i.e., underneath the CNT coating 1004 with Ru nanoparticles 1006); (2) electrons 1022 are transported along a second pathway formed by the conductive CNT coating 1004 on the top surface and surfaces of the cell walls 202; and (3) $O_2$ gas 1024 is allowed to flow along a third pathway formed by the open, unblocked channels 204 of the substrate 200. When the three components meet at the interface, reaction takes place under the influence of an externally applied electric field, thereby forming $Li_2O_2$ products 1028 during the discharge. When charging, a reversible process occurs, along with the disappearance of the accumulated $Li_2O_2$ products 1028.

Figure 11C:
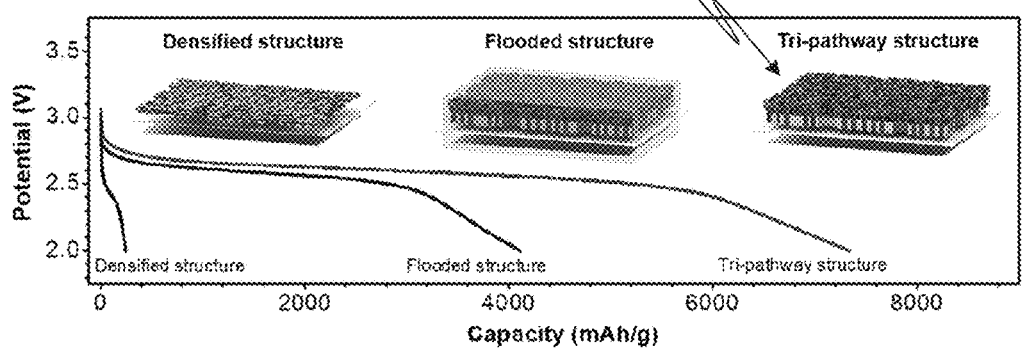
FIG. 11C is a graph illustrating cycling performance of the flexible wood structure as Li—$O_2$ battery as compared to other structures, for a fixed capacity of 1000 mAh/g and a stable Coulombic efficiency of ~100%, according to one or more embodiments of the disclosed subject matter.

Control experiments were compared to the battery cell 1000 with modified flexible substrate 200. In the first control experiment, the channels and rough surface of the modified flexible substrate were eliminated by densification (e.g., pressing) before being assembled into a $Li-O_2$ battery cell. As shown in FIG. 11C, the densified structure (illustration and curve on the left) delivers a very limited capacity of approximately 250 mAh/g at a current density of 200 mA/g and with a much larger overpotential. The elimination of the rough surface and channels also significantly reduces the active sites for redox reactions, thereby decreasing the capacity greatly. The now blocked channels in the densified substrate prevents the continuous supply of $O_2$ gas, thus requiring the battery cell to rely on dissolved gas in the electrolyte. This further reduces the capacity of the battery cell. In addition, the $Li_2O_2$ product will continuously accumulate on the flat surface of the electrode, forming an insulating layer that can enhance the overpotential significantly.

In the second control experiment (middle illustration and curve in FIG. 11C), the same electrode structure as the modified flexible substrate was used, but with overweight electrolyte to flood the channels therein. As shown in FIG. 11C, the flooded structure delivers only half capacity of the unflooded counterpart (illustration and curve on the right) with a slightly increased overpotential. The significant reduction in capacity can be attributed to the blocking of channels by the extra electrolyte and thus preventing the continuous transport of $O_2$ gas from the outside to the cathode site. The slight reduction in overpotential can be attributed to the well-preserved rough surface and channels, both of which provide space for the reversible growth of the $Li_2O_2$ product.

Figure 11D:
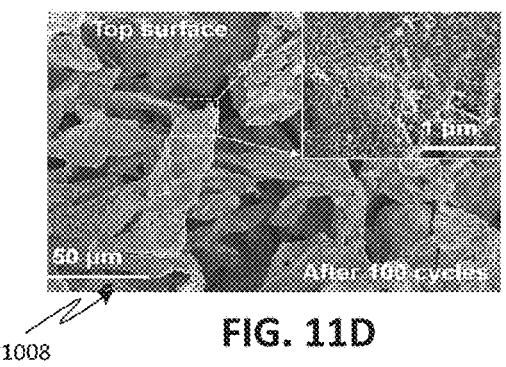
FIG. 11D is an SEM image of the top surface of the flexible wood structure as Li—$O_2$ battery after 100 cycles of charge/discharge, according to one or more embodiments of the disclosed subject matter.
Figure 11E:
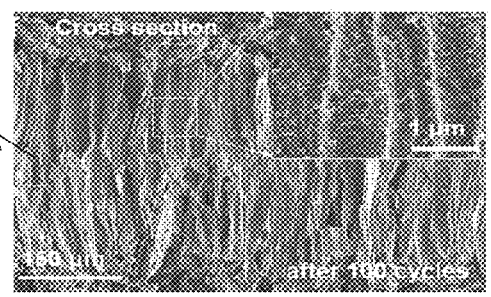
FIG. 11E is an SEM image of the cross-section of the flexible wood structure as Li—$O_2$ battery after 100 cycles of charge/discharge, according to one or more embodiments of the disclosed subject matter.

A battery cell incorporating the modified flexible substrate also exhibits excellent rechargeability. For example, the battery cell can reversibly discharge for 100 cycles with a restricted capacity of 1000 mAh/g at a current density of 200 mA/g. This excellent rechargeability is due to the stable structures of the modified flexible support. As illustrated in FIGS. 11D-11E, the multi-channeled structure with rough flower-like surface 1008 of the modified flexible substrate is maintained even after 100 cycles of discharging and charging. Both coated CNTs 1004 and Ru nanoparticles 1006 are observed, confirming that there is a strong adhesion between the coating 1004 and the wood matrix of the cell walls 202.

As noted above, during the discharging process a layer of reactant 1028 (e.g., $Li_2O_2$) coats the top surface and inside surface of the channels 204, as illustrated in FIGS. 12A-12B. However, the layer of the reactant 1028 is not sufficiently thick to otherwise totally block the channels 204, thereby allowing $O_2$ gas 1024 to be efficiently transported through the channels 204 during the charging/discharging process. Such breathable character is attractive for metal-air battery designs. At the end of the charging process, the reactant 1028 almost completely disappears from the substrate, thereby exposing the CNT coating 1004 and Ru 1006 nanoparticles on the top surface of the substrate 200 and inner surfaces of the channels 204 therein.

Figure 13:
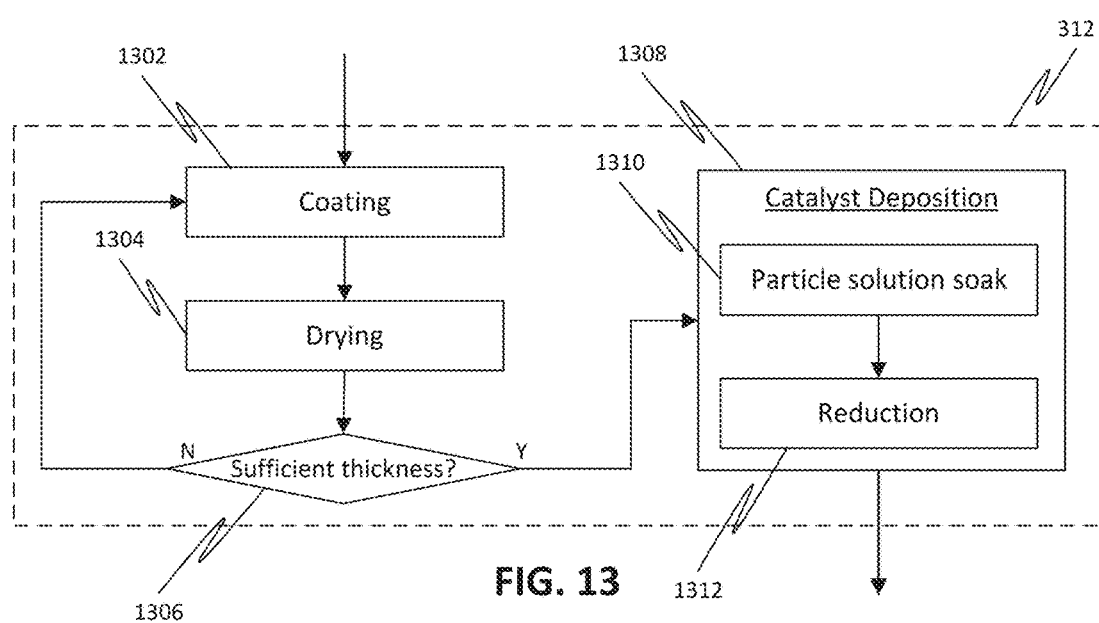
FIG. 13 is a simplified process flow for modification 312 of FIG. 3 for forming a flexible wood battery, according to one or more embodiments of the disclosed subject matter.

FIG. 13 shows a simplified process flow for the modification 312 of FIG. 3 when the flexible wood substrate 200 is used in a battery cell 1000. For example, modification 312 can include, at 1302, coating at least the top surface (e.g., surface 1008 with microsheets) and inner surfaces (e.g., cell walls 202 defining the lumina 204) of the flexible substrate 200. When the coating 1004 comprises CNTs, CNT powder can be dispersed in a solvent such as acetone to make a CNT solution. The flexible wood substrate 200 can be immersed into the CNT solution. During the immersion, the CNT solution and/or the substrate 200 may optionally be sonicated.

As noted above, factors affecting the coating include the thickness of the substrate 200 and immersion time. If the thickness of the substrate 200 is relatively thin (as in the battery cell embodiments) the infiltration of the CNTs into the channels 204 is comparatively easier. The sonication treating time may also be relatively longer to further encourage CNT penetration into the channels 204. Moreover, most of any blockages in the channels 204 are broken down by the prior treatment with chemical solution for partial lignin removal, thereby resulting in substantially unblocked channels, as shown in FIG. 10D. The CNT solution can thus easily penetrate the channels.

The substrate 200 can then be removed from the solution and allowed to air dry 1304 in order to build a layer of CNTs. The coating 1302 and drying 1304 can be repeated at 1306 to build the coating 1004 layer by layer on the surfaces of the flexible substrate 200. One of ordinary skill in the art will appreciate that other coating processes for modification 312, as applied to an energy storage device or any other device incorporating the flexible wood substrate 200, would be applicable to different coating materials and are within the scope of the disclosed subject matter. A uniform coating 1004 is thus disposed on the top surface and inner surfaces of the channels, thereby forming an interconnected and continuous network for electron transport.

Modification 312 can further include deposition of non-wood particles 1006, such as catalytic nanoparticles (or any other particle), at 1308. The deposition of non-wood particles can occur after the formation of the coating 1004, as illustrated in FIG. 13, before forming the coating 1004, or in between formation of different layers of the coating 1004.

For example, the deposited non-wood particles 1006 can be Ru nanoparticles, which can be coated onto the surface of the CNT coating 1004 to act as a catalyst for the oxygen reduction and evolution reactions. In such a configuration, at 1310, the flexible wood substrate 200 can be soaked in a solution of ruthenium chloride ($RuCl_3$) (e.g., concentration of 12 mg/ml) for 12 hours. After 1310, at 1312, the flexible wood substrate 200 can be soaked in a solution of sodium borohydride ($NaBH_4$) in order to reduce the Ru ions.

Figure 10F:
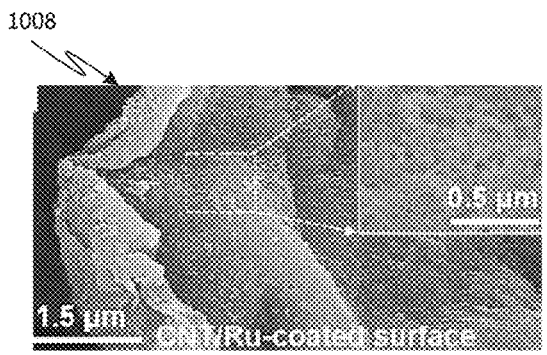
FIG. 10F is a magnified SEM image of a surface of the flexible wood structure as battery, showing carbon-nanotube coating and nanoparticles, according to one or more embodiments of the disclosed subject matter.
Figure 10G:
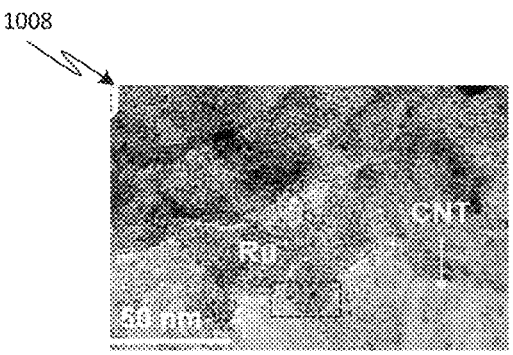
FIG. 10G is a transmission electron microscope (TEM) image of a surface of the flexible wood structure as battery, showing carbon-nanotube coating and nanoparticles, according to one or more embodiments of the disclosed subject matter.

As illustrated in FIG. 10F, numerous tiny Ru nanoparticles 1006 are formed on the surface of the CNT coating 1004. Further confirmation of Ru nanoparticle formation is provided by the transmission electron microscopy (TEM) image of FIG. 10G. Clear lattices with a spacing of 0.21 nm can be observed, thus confirming the crystal structure of the Ru nanoparticles. The particle size of the Ru nanoparticles is very small, with an average diameter of 2.3 nm.

For use 314 of the flexible wood substrate 200 in a battery cell configuration, the modified substrate resulting from 1312 can then be assembled together with a separator membrane 1010 and anode 1012, as described above. Moreover, the cell walls 202 of the substrate 200 can be filled with an electrolyte, as also described above.

Figure 14A:
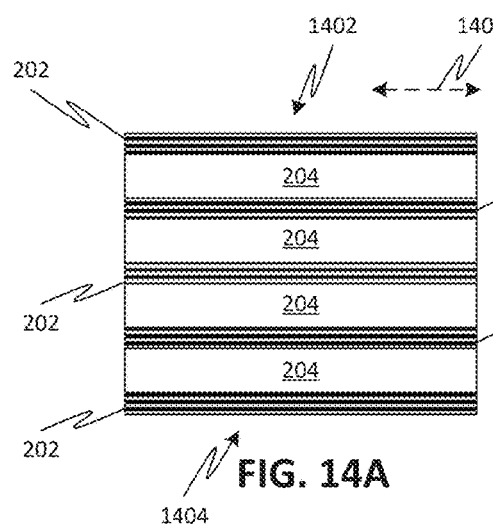
FIG. 14A is a simplified schematic diagram of a cross-section of a flexible wood structure with direction of extension of lumina parallel to a top surface thereof, according to one or more embodiments of the disclosed subject matter.
Figure 14B:
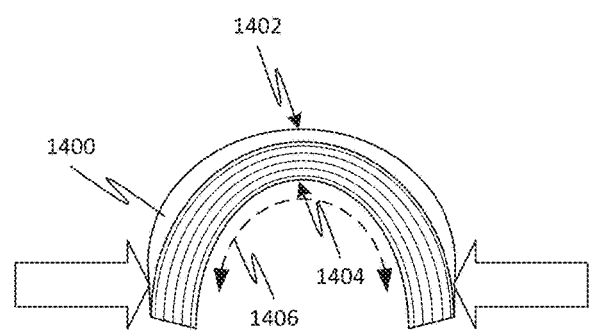
FIG. 14B is a simplified schematic of the flexible wood structure of FIG. 14A subjected to bending.

Although many of the examples discussed herein have a direction of extension of the lumina 204 perpendicular to a top surface (i.e., parallel to a thickness direction of the substrate 200), embodiments of the disclosed subject matter are not limited thereto. Indeed, it is possible to have the direction 1406 of extension of the lumina 204 be parallel to a top surface 1402 or a bottom surface 1404 (i.e., perpendicular to a thickness direction of the substrate), as illustrated for the substrate 1400 of FIGS. 14A-14B. Of course, other orientations for the lumina 204 are also possible according to one or more contemplated embodiments. For example, the direction of extension of the lumina 204 can be at an arbitrary angle within the substrate (i.e., neither aligned with nor perpendicular to a surface of the substrate or to a thickness direction of the substrate).

Figure 15:
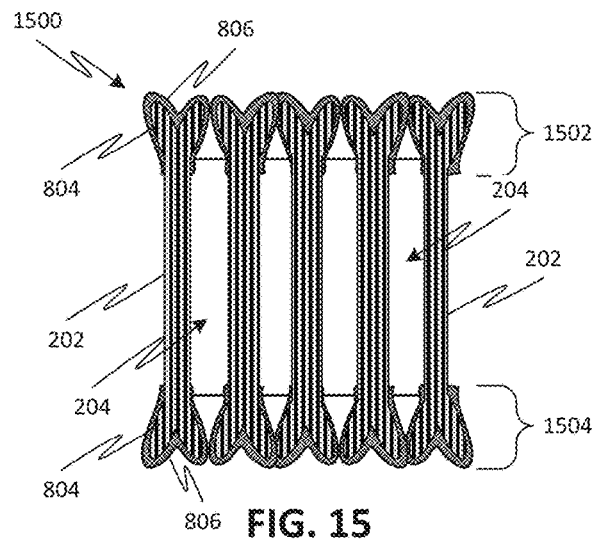
FIG. 15 is a simplified schematic diagram of a cross-section of a flexible wood structure with microsheets on multiple surfaces, according to one or more embodiments of the disclosed subject matter.

Moreover, although FIGS. 8A-8D and 10A-12B employ microsheets 804 on one surface of the substrate (e.g., the top surface), embodiments of the disclosed subject matter are not limited thereto. Rather, more than one surface may also have microsheets 804 according to one or more contemplated embodiments of the disclosed subject matter. For example, FIG. 15 illustrates a configuration 1500 where both a top surface 1502 and a bottom surface 1504 include microsheet projections 804. Although FIG. 15 illustrates a coating 804 on both the top surface 1502 and the bottom surface 1504, it is also possible for only one of the top surface 1502 and the bottom surface 1504 to include the coating, or for all surfaces, including the top surface 1502, the bottom surface 1504, and inner surfaces forming lumina 204 to be coated.

Figure 16:
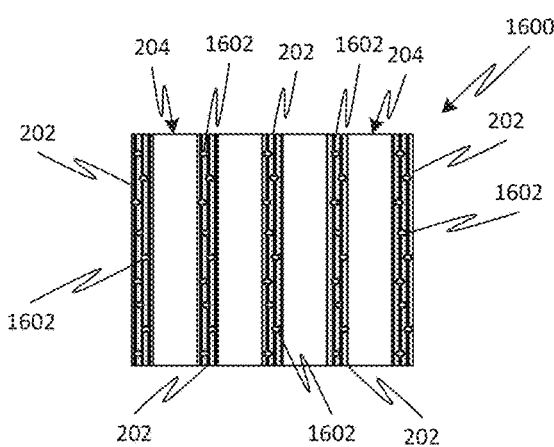
FIG. 16 is a simplified schematic diagram of a cross-section of a hybrid flexible wood structure with nanoparticles intercalated into cell wall 202, according to one or more embodiments of the disclosed subject matter.

In addition to providing non-wood particles on one or more surfaces of the substrate 200, it also possible to provide particles within the wood structure itself. For example, non-wood particles (or other non-native particles) can be intercalated within the cell walls, in particular, in the nano-sized gaps or pores between the cellulose nanofibers forming the cell walls. FIG. 16 illustrates such a configuration 1600, where particles 1602 (e.g., nanoparticles) are disposed within walls 202 of the flexible wood substrate.

In one or more embodiments, the flexible wood substrate 200 can serve as a flexible three-dimensional electrical conductor, for example, by combining with a conductive coating or filling to form a conductive hybrid structure. For example, by using a simple CNT coating (or any other conductive agent, such as, but not limited to, graphene, polyaniline, or carbon black) on inner or outer surfaces of the wood, the flexible wood substrate 200 can be modified as a flexible three-dimensional conductor.

Figure 17:
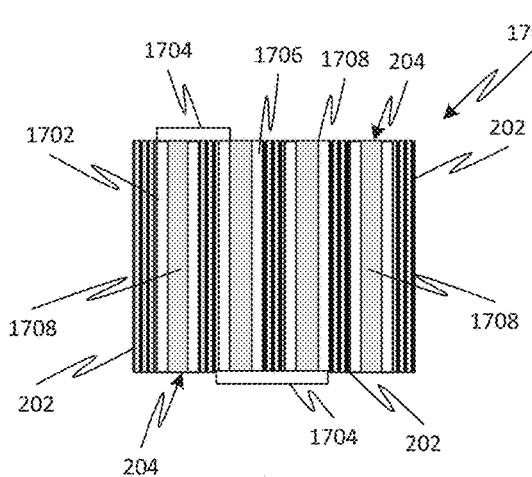
FIG. 17 is a simplified schematic diagram of a cross-section of another hybrid flexible wood structure including conductive elements, according to one or more embodiments of the disclosed subject matter

Moreover, the flexible wood substrate 200 may be used as a template for forming an electrical circuit with conductive traces. For example, FIG. 17 illustrates a configuration 1700 where a conductive coating 1702 is provided over inner surfaces of cell walls 202. An insulating filling 1708 may optionally be disposed with the lumina 204. Conductive traces 1704 disposed on external surfaces of the substrate may connect the conductive coatings 1702 within lumina 204 to form an electrical circuit. Alternatively, the configuration 1700 may employ insulating coatings 1702 surrounding a semiconductive material 1708 within lumina 204. Again, conductive traces 1704 disposed on external surfaces of the substrate may connect the semiconductive materials 1708 or other conductive connections to form an electrical circuit.

Figure 18:
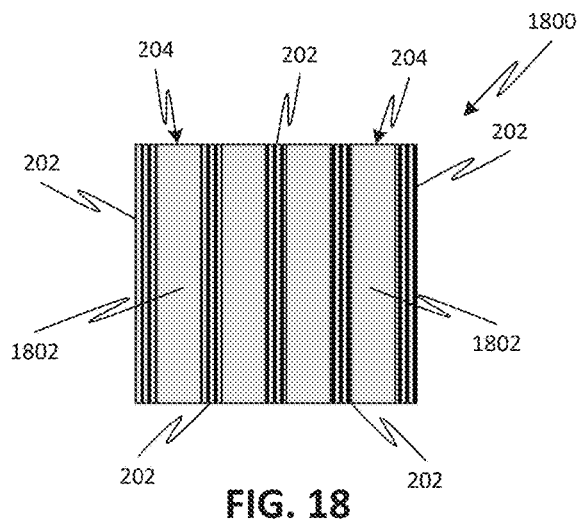
FIG. 18 is a simplified schematic diagram of a cross-section of another hybrid flexible wood structure with filled lumina, according to one or more embodiments of the disclosed subject matter.

In one or more embodiments, the open (or partially collapsed) lumina 204 of the flexible wood substrate 200 can be filled with a flexible polymer. For example, the lumina 204 can be filled with a hydrogel or a silicone polymer. FIG. 18 illustrates such a configuration 1800 wherein lumen 204 are filled by a flexible polymer 1802, such that the substrate 200 can retain its flexible nature.

In one or more embodiments, the fabrication process for the flexible wood substrate 200 can be slightly modified to form a network of entangled cellulose nanofibers within the lumina 204. In such a configuration, the substrate 200 may exhibit highly elastic, anisotropic properties and may be considered a hydrogel. FIGS. 19A-19C illustrate such a flexible wood substrate acting as a hydrogel 1900, where nanofibers 1904 within each lumina 204 become entangled.

The hydrogel 1900 can be fabricated by slightly modifying the generalized fabrication of FIG. 3, in particular by eliminating the rinsing step between the drying 310 and the chemical treatment 304, as illustrated in FIG. 20. Moreover, the drying 310 can include freeze-drying rather than air drying or critical point drying. Since the wood substrate is not subject to rinsing, cellulose nanofibers 1904 released from the cells walls 202 by the chemical treatment 304 remain within the substrate rather than being washed away. These free nanofibers 1904 can reassemble and entangle with each other to form an interconnected network within the lumina 204, as illustrated in FIG. 19C. In particular, in the freeze-drying process 310 following the chemical treatment 304, any ice formation can act as template for the formation of the interconnected fiber network inside the lumina 204, the fiber network being comprised of entangled cellulose nanofibers 1904. In some embodiments, after the drying, the hydrogel 1900 can be hydrated such that the inner volumes of the cellulose-based lumina can be filled with the interconnected fiber network and a fluid (e.g., water) trapped by the fiber network.

This fiber network can imbue the hydrogel 1900 with a superior ability to handle compression forces as well as the ability to handle tension forces resulting from the partial lignin and hemicellulose removal. Thus, the hydrogel 1900 not only exhibits superior mechanical flexibility in tension, similar to those properties discussed above for flexible wood substrate 200, but also superior properties in compression. For example, the hydrogel 1900 can be subjected to compression of at least 40% (for example up to 70%) and can totally recover its original shape after release of the compression force. Such superior performance of the hydrogel 1900 is demonstrated by FIG. 21A, which shows stress-strain curves of dry natural wood, wet natural wood, and the elastic wood hydrogel 1900 at a compression strain of 60% (with force application as illustrated in FIG. 21B).

In addition, after the mechanical compression testing as shown in FIG. 21A, the elastic wood hydrogel 1900 may experience only a negligible change in height (i.e., in a direction parallel to the direction of force application), whereas the wet wood and the dry wood both experience significant reductions in height. For example, the height loss of the elastic wood hydrogel may be less than 1% (e.g., approximately 0%), while the height losses for the wet wood and the dry wood both are about 32% and 44%, respectively.

As is readily apparent from the above description, many variations with the flexible wood substrate 200 serving as a base are possible. Indeed, different substrates 200 with different modifications can be assembled together to yield a composite hybrid device with favorable mechanical properties. For example, a first flexible substrate 200 can be formed as a battery cell, a second flexible substrate 200 can be formed as a flexible three-dimensional conductor, and a third flexible substrate 200 can be formed as part of an electrical circuit, with the flexible conductor providing power from the battery cell to the electrical circuit. The different substrates 200 may be coupled together on a common larger flexible substrate 200 acting as a support, for example, as a wearable device. Other configurations are also possible and within the contemplated scope of the present disclosure.

In one or more first embodiments, a structure comprises a flexible substrate of natural wood that has been chemically modified to partially remove hemicellulose and lignin therein while substantially preserving a structure of cellulose-based lumina.

In the first embodiments, or any other embodiment, the natural wood retains at least some of the hemicellulose and lignin after the chemical modification. In the first embodiments, or any other embodiment, between 5% and 95% of the lignin has been removed by the chemical modification.

In the first embodiments, or any other embodiment, the natural wood retains at least 20% of the cellulose after the chemical modification. In the first embodiments, or any other embodiment, the natural wood retains at least 40% of the cellulose after the chemical modification. In the first embodiments, or any other embodiment, the natural wood retains at least 60% of the cellulose after the chemical modification. In the first embodiments, or any other embodiment, the natural wood retains at least 90% of the cellulose after the chemical modification.

In the first embodiments, or any other embodiment, in cross-sectional view, the cellulose-based lumina have crumpled or have a shrunken diameter as compared to the natural wood before the chemical modification.

In the first embodiments, or any other embodiment, the flexible substrate has an increased flexibility as compared to the natural wood before the chemical modification. In the first embodiments, or any other embodiment, the bending radius of the chemically modified natural wood of the flexible substrate is at least 2 times smaller than that of the natural wood before the chemical modification. In the first embodiments, or any other embodiment, the bending radius of the chemically modified natural wood of the flexible substrate is at least 5 times smaller than that of the natural wood before the chemical modification. In the first embodiments, or any other embodiment, the bending radius of the chemically modified natural wood of the flexible substrate is at least 10 times smaller than that of the natural wood before the chemical modification. In the first embodiments, or any other embodiment, the bending radius of the chemically modified natural wood of the flexible substrate is at least 50 times smaller than that of the natural wood before the chemical modification.

In the first embodiments or any other embodiment, the tensile strength of the chemically modified natural wood of the flexible substrate is at least 10% greater than the natural wood before the chemical modification. In the first embodiments or any other embodiment, the tensile strength of the chemically modified natural wood of the flexible substrate is at least 2 times greater than the natural wood before the chemical modification. In the first embodiments or any other embodiment, the tensile strength of the chemically modified natural wood of the flexible substrate is at least 5 times greater than the natural wood before the chemical modification. In the first embodiments or any other embodiment, the tensile strength of the chemically modified natural wood of the flexible substrate is at least 7 times greater than the natural wood before the chemical modification.

In the first embodiments or any other embodiment, the weight of the chemically modified natural wood of the flexible substrate is at least 5% less than the natural wood before the chemical modification. In the first embodiments or any other embodiment, the weight of the chemically modified natural wood of the flexible substrate is at least 20% less than the natural wood before the chemical modification.

In the first embodiments or any other embodiment, a dimension (e.g., width, thickness, or length) of the chemically modified natural wood of the flexible substrate is at least 5% less than the natural wood before the chemical modification. In the first embodiments or any other embodiment, a dimension (e.g., width, thickness, or length) of the chemically modified natural wood of the flexible substrate is at least 15% less than the natural wood before the chemical modification. In the first embodiments or any other embodiment, a dimension (e.g., width, thickness, or length) of the chemically modified natural wood of the flexible substrate is at least 35% less than the natural wood before the chemical modification.

In the first embodiments or any other embodiment, a modulus of the chemically modified natural wood of the flexible substrate is at least 1% less than the natural wood before the chemical modification. In the first embodiments or any other embodiment, a modulus of the chemically modified natural wood of the flexible substrate is at least 5% less than the natural wood before the chemical modification. In the first embodiments or any other embodiment, a modulus of the chemically modified natural wood of the flexible substrate is at least 10% less than the natural wood before the chemical modification.

In the first embodiments or any other embodiment, the lumina extend perpendicular to a thickness direction of the flexible substrate. In the first embodiments or any other embodiment, a dimension of the flexible substrate in a direction perpendicular to the thickness direction is greater than a dimension of the flexible substrate in the thickness direction.

In the first embodiments or any other embodiment, the flexible substrate has sufficient flexibility so as to return to its original shape after being folded onto itself or being twisted more than 45°. In the first embodiments or any other embodiment, the flexible substrate has sufficient flexibility so as to return to its original shape after being folded onto itself or being twisted more than 90°. In the first embodiments or any other embodiment, the flexible substrate has sufficient flexibility so as to return to its original shape after being folded onto itself or being twisted more than 135°.

In the first embodiments or any other embodiment, the natural wood of the flexible substrate is a monolithic piece. In the first embodiments or any other embodiment, the flexible substrate consists essentially of the chemically modified natural wood.

In the first embodiments or any other embodiment, the lumina extend in a thickness direction of the flexible substrate. In the first embodiments or any other embodiment, a dimension of the flexible substrate in a direction perpendicular to the thickness direction is greater than a dimension of the flexible substrate in the thickness direction.

In the first embodiments or any other embodiment, cellulose nanofibers of the chemically modified natural wood are substantially aligned along a common direction. In the first embodiments or any other embodiment, the chemically modified natural wood has nanopores between the aligned cellulose nanofibers. In the first embodiments or any other embodiment, inner volumes of at least some of the cellulose-based lumina of the flexible substrate are open or unobstructed.

In the first embodiments or any other embodiment, inner volumes of the cellulose-based lumina are filled with an interconnected fiber network and a fluid. In the first embodiments or any other embodiment, cellulose nanofibers within each inner volume of the cellulose-based lumina are entangled with each other. In the first embodiments or any other embodiment, the flexible substrate is constructed to return to its original shape after being compressed by at least 20%.

In the first embodiments or any other embodiment, the natural wood is hard wood or softwood. In the first embodiments or any other embodiment, the natural wood is one of basswood, oak, poplar, ash, alder, aspen, balsa wood, beech, birch, cherry, butternut, chestnut, cocobolo, elm, hickory, maple, oak, padauk, plum, walnut, willow, yellow poplar, baldcypress, cedar, cypress, douglas fir, fir, hemlock, larch, pine, redwood, spruce, tamarack, juniper and yew.

In the first embodiments or any other embodiment, the structure further comprises a plurality of non-wood cells attached to cell wall surfaces forming the lumina in the flexible substrate. The flexible substrate can act as a tissue scaffold for the non-wood cells. In the first embodiments or any other embodiment, the plurality of non-wood cells forms a tissue on the flexible substrate. In the first embodiments or any other embodiment, the plurality of non-wood cells comprise human or animal cells.

In the first embodiments or any other embodiment, the structure has a coating on the flexible substrate. In the first embodiments or any other embodiment, the coating comprises a conductor, a semiconductor, or an insulator. In the first embodiments or any other embodiment, the coating comprises at least one of nanoparticles, nanowires, graphene, graphite, single-walled carbon nanotubes, double-walled carbon nanotubes, and multi-walled carbon nanotubes.

In the first embodiments or any other embodiment, the coating is a light-absorbing coating. In the first embodiments or any other embodiment, the flexible substrate has a first surface with a plurality of micro-sheet protrusions extending therefrom, and the light-absorbing coating is disposed on the first surface including the micro-sheet protrusions. In the first embodiments or any other embodiment, the first surface is perpendicular to a direction in which the lumina extend. In the first embodiments or any other embodiment, inner surfaces of the lumina away from the first surface remain uncoated by the light-absorbing coating. In the first embodiments or any other embodiment, the flexible substrate is constructed such that fluid is pumped to the first surface from a second surface opposite the first surface via capillary action and/or nano-cavitation effects. In the first embodiments or any other embodiment, the flexible substrate is constructed to float on the fluid, with the second surface on or within the fluid. In the first embodiments or any other embodiment, the first surface of the flexible substrate is an evaporative surface and the structure acts as a steam or vapor generation device.

In the first embodiments or any other embodiment, the structure acts as a steam generation device having a solar thermal efficiency of at least 60% at 10 kW/m$^2$. In the first embodiments or any other embodiment, the structure acts as a steam generation device having a solar thermal efficiency of at least 70% at 10 kW/m$^2$. In the first embodiments or any other embodiment, the structure acts as a steam generation device having a solar thermal efficiency of at least 80% at 10 kW/m$^2$.

In the first embodiments or any other embodiment, the coating comprises at least one of carbon nanotubes (CNT), carbon black, graphite, hard carbon, reduced graphene oxide, graphene, plasmonic metallic nanoparticles, and semiconductor nanoparticles. In the first embodiments or any other embodiment, the plasmonic nanoparticles comprise at least one of Au, Pt, Ag, Pd, and Ru. In the first embodiments or any other embodiment, the semiconductor nanoparticles comprise $CuFeSe_2$ or any other type of semiconductor. In the first embodiments or any other embodiment, the coating on the flexible substrate is an electrically-conductive coating.

In the first embodiments or any other embodiment, the flexible substrate has a first surface with a plurality of micro-sheet protrusions extending therefrom, and the electrically-conductive coating is disposed on the first surface including the micro-sheet protrusions and on inner surfaces forming the lumina within the flexible substrate. In the first embodiments or any other embodiment, the first surface is perpendicular to a direction in which the lumina extend. In the first embodiments or any other embodiment, the structure acts as at least one of a conductor, a part of an electrical circuit, and a battery.

In the first embodiments or any other embodiment, the flexible substrate defines a first pathway through cell walls of the lumina for ion transport, a second pathway through inner volumes of the lumina for transport of a gas, and a third pathway via the electrically-conductive coating for transport of electrons.

In the first embodiments or any other embodiment, the structure comprises an anode, an electrolyte solution filling at least the flexible substrate, and a separator membrane disposed between the flexible substrate and the anode. The flexible substrate can act as a current collector-free cathode and the structure can be configured as a battery. In the first embodiments or any other embodiment, the ions transported by the first pathway are lithium ions (Lit), the gas transported by the second pathways is oxygen gas ($O_2$), and the wood-based structure is configured as a $Li$—$O_2$ battery.

In the first embodiments or any other embodiment, the structure has a plurality of catalytic nanoparticles and/or electroactive particles disposed on a surface of the electrically-conductive coating. In the first embodiments or any other embodiment, the catalytic nanoparticles comprise ruthenium (Ru).

In the first embodiments or any other embodiment, a plurality of non-wood particles is coupled to one or more surfaces of the flexible substrate. In the first embodiments or any other embodiment, the non-wood particles coupled to the flexible substrate surface(s) comprise metallic nanoparticles, metal alloy nanoparticles, semiconductor nanoparticles, sulfides, phosphides, borides, or oxides. In the first embodiments or any other embodiment, the metallic nanoparticles or the metal alloy nanoparticles comprise at least one of Pt, Pd, Au, Ag, Ni, Co, Ru, and Fe. In the first embodiments or any other embodiment, the semiconductor nanoparticles comprise $CuFeSe_2$ or any other semiconductor. In the first embodiments or any other embodiment, the sulfides comprise at least one of $MoS_2$, $CoS_x$, and $FeS_2$, where x is an integer. In the first embodiments or any other embodiment, the phosphides comprise at least one of CoP, $NiP_2$, and $MoP_x$, where x is integer. In the first embodiments or any other embodiment, the borides comprise at least one of CoB, MoB, and NiB. In the first embodiments or any other embodiment, the oxides comprise at least one of $MnO_2$, $Fe_2O_3$, CoO, and NiO.

In the first embodiments or any other embodiment, the electrically-conductive coating comprises carbon nanotubes (CNT), graphene, polyaniline, or carbon black.

In the first embodiments or any other embodiment, the flexible substrate has sufficient flexibility so as to be wrapped around and worn on an appendage or another body part of a user and to return to its original shape when released.

In one or more second embodiments, a method comprises treating a piece of natural wood with a chemical solution so as to partially remove hemicellulose and lignin therein while substantially preserving a structure of cellulose-based lumina, and then drying the piece of chemically-treated natural wood. The treating and the drying increase a flexibility of said piece.

In the second embodiments or any other embodiment, the drying is performed in air, such that the cellulose-based lumina crumple in a cross-sectional view. In the second embodiments or any other embodiment, the drying comprises freeze drying or critical point drying, such that the cellulose-based lumina remain open in a cross-sectional view.

In the second embodiments or any other embodiment, the chemical solution has a pH greater than 7. In the second embodiments or any other embodiment, the chemical solution comprises at least one of NaOH, $Na_2SO_3$, $(NH_4)_2SO_3$, p-TsOH, $NH_3 \cdot H_2O$, $NaOH+Na_2S$, $Na_2CO_3$, $NaOH+Na_2SO_3$, $NaOH+(NH_4)_2SO_3$, $NH_4OH+(NH_4)_2SO_3$, $NH_4OH+Na_2SO_3$, $NaOH+Na_2CO_3$, NaOH+AQ, $NaOH/Na_2S+AQ$, $NaOH+Na_2SO_3+AQ$, $Na_2SO_3+AQ$, $NaOH+Na_2S+Na_2S_n$, $Na_2SO_3+NaOH+CH_3OH+AQ$, $C_2H_5OH+NaOH$, $C_2H_8N_2$, $C_2H_7NO+NH_3$—$H_2O$, $N_2H_4$-$H_2O$, and $NaHCO_3$, where n in an integer and AQ is Anthraquinone. In the second embodiments or any other embodiment, the chemical solution comprises a mixture of NaOH and $Na_2SO_3$. In the second embodiments or any other embodiment, the chemical solution comprises 2.5M of NaOH and 0.4M of $Na_2SO_3$. In the second embodiments or any other embodiment, the chemical solution is boiling.

In the second embodiments or any other embodiment, the method comprises, before the drying and after the treating, immersing the piece of chemically-treated natural wood in a solvent to remove remnants of the chemical solution in said piece. In the second embodiments or any other embodiment, said solvent comprises boiling de-ionized (DI) water.

In the second embodiments or any other embodiment, the treating comprises immersing the piece of natural wood in the chemical solution for at least ten minutes. In the second embodiments or any other embodiment, the treating is performed under vacuum, such that the chemical solution penetrates into the lumina of the piece of natural wood.

In the second embodiments or any other embodiment, at least some of the hemicellulose and lignin are retained by said piece after the treating. In the second embodiments or any other embodiment, between 5% and 95% of the lignin has been removed from said piece by the treating. In the second embodiments or any other embodiment, said piece retains at least 20% of the cellulose after the treating.

In the second embodiments or any other embodiment, a tensile strength of said piece is at least 2 times greater than that before the treating. In the second embodiments or any other embodiment, a bending radius of said piece is at least 2 times smaller than that before the treating.

In the second embodiments or any other embodiment, the method comprises, after the drying, forming entangled fiber networks within inner volumes of the lumina of said piece. In the second embodiments or any other embodiment, the treating and drying are such that cellulose nanofibers within inner volumes of the lumina are entangled with each other. In the second embodiments or any other embodiment, the piece of chemically-treated natural wood is subjected to the drying after the treating without any rinsing in between.

In the second embodiments or any other embodiment, said piece is a monolithic block, strip, bar, sheet, or membrane.

In the second embodiments or any other embodiment, cellulose nanofibers of the wood are substantially aligned along a common direction after the treating, and the treating is such that nanopores are introduced between the aligned cellulose nanofibers. In the second embodiments or any other embodiment, after the drying, inner volumes of at least some of the cellulose-based lumina of the wood are open or unobstructed.

In the second embodiments or any other embodiment, the piece of natural wood is hard wood or softwood. In the second embodiments or any other embodiment, the piece of natural wood is one of basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, douglas fir, fir, hemlock, larch, pine, redwood, spruce, tamarack, juniper and yew In the second embodiments or any other embodiment, the method comprises, after the drying, seeding a plurality of non-native cells on the piece of chemically-treated natural wood. In the second embodiments or any other embodiment, the method comprises, after the seeding, culturing the non-native cells to form a cell population, cell culture, or tissue. In the second embodiments or any other embodiment, the culturing includes transporting nutrients to the non-native cells and metabolic byproducts from the non-native cells via the preserved structure. In the second embodiments or any other embodiment, the non-native cells are non-wood cells. In the second embodiments or any other embodiment, the non-wood cells are human or animal cells.

In the second embodiments or any other embodiment, the method comprises, after the drying, at least one of bending or folding the piece of chemically-treated natural wood onto itself, twisting the piece of chemically-treated natural wood more than 45°, and wrapping the piece of chemically-treated natural wood around an appendage or another body part of a user. In the second embodiments or any other embodiment, the bending, folding, twisting, or wrapping includes at least two simultaneous folds or twists. In the second embodiments or any other embodiment, the method comprises, after the bending, folding, twisting, or wrapping, releasing the piece of chemically-treated natural wood such that it returns to its original shape. In the second embodiments or any other embodiment, the original shape is a substantially flat shape.

In the second embodiments or any other embodiment, the method comprises, after the drying, forming a coating on the piece of chemically-treated natural wood. In the second embodiments or any other embodiment, the coating comprises a conductor, a semiconductor, or an insulator. In the second embodiments or any other embodiment, the coating comprises at least one of nanoparticles, nanowires, graphene, graphite, single-walled carbon nanotubes, double-walled carbon nanotubes, and multi-walled carbon nanotubes. In the second embodiments or any other embodiment, the coating comprises at least one of carbon nanotubes (CNT), carbon black, graphite, hard carbon, reduced graphene oxide, graphene, plasmonic metallic nanoparticles, and semiconductor nanoparticles. In the second embodiments or any other embodiment, the plasmonic nanoparticles comprise at least one of Au, Pt, Ag, Pd, and Ru. In the second embodiments or any other embodiment, the semiconductor nanoparticles comprise $CuFeSe_2$ or any other semiconductor.

In the second embodiments or any other embodiment, the coating is comprised of carbon nanotubes (CNT) and the forming comprises immersing the piece of chemically-treated natural wood in a CNT solution and then, drying the piece of chemically-treated natural wood. In the second embodiments or any other embodiment, the method comprises sonicating the CNT solution during the immersing in the CNT solution.

In the second embodiments or any other embodiment, the piece of chemically-treated natural wood has a first surface perpendicular to a direction in which the lumina extend, and the forming is such that the coating is formed on the first surface while inner surfaces of the lumina away from the first surface remain uncoated. In the second embodiments or any other embodiment, the piece of chemically-treated natural wood has a first surface parallel to a direction in which the lumina extend, and the forming is such that the coating is formed on the first surface.

In the second embodiments or any other embodiment, the method comprises, prior to the forming a coating, forming at a surface of said piece a plurality of micro-sheet protrusions extending therefrom, and the forming a coating is such that the coating is formed on the micro-sheet protrusions. In the second embodiments or any other embodiment, the forming the plurality of micro-sheet protrusions includes cutting natural word to form the surface of said piece.

In the second embodiments or any other embodiment, the method comprises, after the forming a coating placing a second surface of the piece of chemically-treated natural wood, opposite to the first surface, in contact with a fluid source, and exposing the coated first surface to a source of light, such that fluid pumped to the first surface from the second surface via capillary action and/or nano-cavitation effects is heated to generate steam or vapor.

In the second embodiments or any other embodiment, the piece of chemically-treated natural wood has a first surface parallel to a direction in which the lumina extend, and the forming is such that the coating is formed on at least the first surface and inner surfaces of the lumina. In the second embodiments or any other embodiment, the piece of chemically-treated natural wood has a first surface perpendicular to a direction in which the lumina extend, and the forming is such that the coating is formed on the first surface and on inner surfaces of the lumina.

In the second embodiments or any other embodiment, the method comprises, after the forming a coating, depositing a plurality of catalytic nanoparticles and/or electroactive particles on a surface of the coating. In the second embodiments or any other embodiment, the catalytic nanoparticles comprise ruthenium (Ru).

In the second embodiments or any other embodiment, the method further comprises, coupling non-native (e.g., non-wood) particles to one or more surfaces of said piece of chemically-treated natural wood. In the second embodiments or any other embodiment, the non-native particles comprise metallic nanoparticles, metal alloy nanoparticles, sulfides, phosphides, borides, or oxides. In the second embodiments or any other embodiment, the metallic nanoparticles or the metal alloy nanoparticles comprise at least one of Pt, Pd, Au, Ag, Ni, Co, Ru, and Fe. In the second embodiments or any other embodiment, the sulfides comprise at least one of $MoS_2$, $CoS_x$, and $FeS_2$, where x is an integer. In the second embodiments or any other embodiment, the phosphides comprise at least one of CoP, $NiP_2$, and $MoP_x$, where x is an integer. In the second embodiments or any other embodiment, the borides comprise at least one of CoB, MoB, and NiB. In the second embodiments or any other embodiment, the oxides comprise at least one of $MnO_2$, $Fe_2O_3$, CoO, and NiO.

In the second embodiments or any other embodiment, the method comprises coupling to one or more surfaces of the piece of chemically-treated natural wood at least one of nanoparticles, nanowires, graphene, graphite, single-walled carbon nanotubes, double-walled carbon nanotubes, and multi-walled carbon nanotubes. In the second embodiments or any other embodiment, the method comprises intercalating in one or more cellulose walls of the lumina of the piece of chemically-treated natural wood at least one of nanoparticles, nanowires, graphene, graphite, single-walled carbon nanotubes, double-walled carbon nanotubes, and multi-walled carbon nanotubes.

In the second embodiments or any other embodiment, the method comprises, filling the lumina of the chemically-treated natural wood with a flexible polymer. In the second embodiments or any other embodiment, the flexible polymer comprises a silicone polymer. In the second embodiments or any other embodiment, the method comprises, prior to the filling with a flexible polymer, forming a coating on the piece of chemically-treated natural wood. In the second embodiments or any other embodiment, the coating comprises a conductor, a semiconductor, or an insulator.

In the second embodiments or any other embodiment, the method comprises, after the depositing, disposing a separator membrane between an anode and a second surface of the piece of chemically-treated natural wood, the second surface being opposite to the first surface, and filling at least the piece of chemically-treated natural wood with an electrolyte solution. In the second embodiments or any other embodiment, the method comprises applying a voltage between the piece of chemically-treated natural wood and the anode so as to store charge therein.

In one or more third embodiments, a structure is formed by treating natural wood with a chemical solution that partially removes hemicellulose and lignin therein while substantially preserving a structure of cellulose-based lumina, and the treated piece of natural wood has a bending radius that is at least 2 times smaller than that of the natural wood before treatment.

In the third embodiments or any other embodiment, the treated natural wood has sufficient flexibility so as to return to its original shape after being folded onto itself or being twisted more than 45°.

In the third embodiments or any other embodiment, the treated natural wood has a continuous first surface perpendicular to a direction in which the lumina extend, and a continuous second surface opposite to the first surface.

In the third embodiments or any other embodiment, between 5% and 95% of the lignin in the natural wood has been removed by the treating with the chemical solution.

In the third embodiments or any other embodiment, the treating comprises immersing the natural wood in the chemical solution for a first time and, after the immersing, drying the natural wood. In the third embodiments or any other embodiment, the chemical solution has a pH greater than 7 and comprises at least one of $NaOH$, $Na_2SO_3$, $(NH_4)_2SO_3$, p-TsOH, $NH_3·H_2O$, $NaOH+Na_2S$, $Na_2CO_3$, $NaOH+Na_2SO_3$, $NaOH+(NH_4)_2SO_3$, $NH_4OH+(NH_4)_2SO_3$, $NH_4OH+Na_2SO_3$, $NaOH+Na_2CO_3$, $NaOH+AQ$, $NaOH/Na_2S+AQ$, $NaOH+Na_2SO_3+AQ$, $Na_2SO_3+AQ$, $NaOH+Na_2S+Na_2S_n$, $Na_2SO_3+NaOH+CH_3OH+AQ$, $C_2H_5OH+NaOH$, $C_2H_8N_2$, $C_2H_7NO+NH_3$—$H_2O$, $N_2H_4$-$H_2O$, and $NaHCO_3$, where n in an integer and AQ is Anthraquinone. In the third embodiments or any other embodiment, the chemical solution comprises a mixture of $NaOH$ and $Na_2SO_3$, and the first time is a least ten minutes.

In one or more fourth embodiments, a hybrid structure comprises the structure of any of the first and third embodiments, or a structure formed by the method of any of the second embodiments, and at least one of nanoparticles, nanowires, graphene, graphite, single-walled carbon nanotubes, double-walled carbon nanotubes, and multi-walled carbon nanotubes coupled to a surface of said structure.

In one or more fifth embodiments, a biological tissue scaffold comprises the hybrid structure of any of the fourth embodiments, the structure of any of the first and third embodiments, or a structure formed by the method of any of the second embodiments.

In one or more sixth embodiments, a structural or building material comprises the hybrid structure of any of the fourth embodiments, the structure of any of the first and third embodiments, or a structure formed by the method of any of the second embodiments.

In one or more seventh embodiments, a steam or vapor generation system comprises the hybrid structure of any of the fourth embodiments, the structure of any of the first and third embodiments, or a structure formed by the method of any of the second embodiments.

In one or more eight embodiments, a distillation system comprises the steam or vapor generation system of any of the seventh embodiments.

In one or more ninth embodiments, battery comprises the hybrid structure of any of the fourth embodiments, the structure of any of the first and third embodiments, or a structure formed by the method of any of the second embodiments.

In one or more tenth embodiments, an electronic device comprises the battery of any of the ninth embodiments.

In one or more eleventh embodiments, a conductor or electronic device comprises the hybrid structure of any of the fourth embodiments, the structure of any of the first and third embodiments, or a structure formed by the method of any of the second embodiments.

In one or more twelfth embodiments, a wearable device comprises the hybrid structure of any of the fourth embodiments, the structure of any of the first and third embodiments, or a structure formed by the method of any of the second embodiments, wherein the structure is constructed to be wrapped around and worn on an appendage or other body part of a user.

In one or more thirteenth embodiments, a shape memory device comprises the hybrid structure of any of the fourth embodiments, the structure of any of the first and third embodiments, or a structure formed by the method of any of the second embodiments, wherein the structure is constructed to return to its original shape after release of a force deforming the structure.

In one or more fourteenth embodiments, a hybrid structure comprises a flexible substrate of natural wood that has been chemically modified to partially remove hemicellulose and lignin therein while substantially preserving a structure of cellulose-based lumina, and a non-native material coupled to surfaces of the lumina.

In the fourteenth embodiments or any other embodiment, the non-native material is a non-wood material. In the fourteenth embodiments or any other embodiment, the non-wood material comprises at least one of nanoparticles, nanowires, and a coating. In the fourteenth embodiments or any other embodiment, the non-wood material is conducting, semiconducting, or insulating.

In the fourteenth embodiments or any other embodiment, the coating comprises at least one of graphene, graphite, single-walled carbon nanotubes, double-walled carbon nanotubes, multi-walled carbon nanotubes, nanoparticles, sulfides, phosphides, borides, and oxides. In the fourteenth embodiments or any other embodiment, the nanoparticles comprise at least one of Pt, Pd, Au, Ag, Ni, Co, Ru, Fe, and $CuFeSe_2$. In the fourteenth embodiments or any other embodiment, the sulfides comprise at least one of $MoS_2$, $CoS_x$, and $FeS_2$, where x is an integer. In the fourteenth embodiments or any other embodiment, the phosphides comprise at least one of $CoP$, $NiP_2$, and $MoP_x$, where x is an integer. In the fourteenth embodiments or any other embodiment, the borides comprise at least one of $CoB$, $MoB$, and $NiB$. In the fourteenth embodiments or any other embodiment, the oxides comprise at least one of $MnO_2$, $Fe_2O_3$, $CoO$, and $NiO$.

In the fourteenth embodiments or any other embodiment, the non-wood material comprises a flexible polymer at least partially filling the lumina. In the fourteenth embodiments or any other embodiment, the flexible polymer comprises a silicone polymer.

In the fourteenth embodiments or any other embodiment, the hybrid structure includes conductive portions and is configured as an electronic device.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The foregoing descriptions apply, in some cases, to examples generated in a laboratory, but these examples can be extended to production techniques. Thus, where quantities and techniques apply to the laboratory examples, they should not be understood as limiting.

It is thus apparent that there is provided, in accordance with the present disclosure, flexible wood structures and devices, and methods for fabricating and use thereof. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A method comprising:
treating a piece of natural wood with a chemical solution so as to partially remove hemicellulose and lignin therein, wherein after the treating, the piece of chemically-treated natural wood retains at least some lignin and cellulose-based lumina defined by wood cells formed of cellulose nanofibers;
after the treating, drying the piece of chemically-treated natural wood; and
using the dried piece of chemically-treated natural wood as a flexible structure that bends without fracturing,
wherein a flexibility of the piece of chemically-treated natural wood after the treating and the drying is greater than a flexibility of the piece of natural wood before the treating and drying, and
during the using, inner volumes of at least some of the retained cellulose-based lumina remain open or unobstructed.

2. The method of claim 1, wherein the drying is performed in air, such that the cellulose-based lumina crumple in a cross-sectional view.

3. The method of claim 1, wherein the drying comprises freeze drying or critical point drying, such that the cellulose-based lumina remain open in a cross-sectional view.

4. The method of claim 1, wherein the chemical solution comprises at least one of NaOH, $Na_2SO_3$, $(NH_4)_2SO_3$, p-TsOH, $NH_3 \cdot H_2O$, NaOH+$Na_2S$, $Na_2CO_3$, NaOH+$Na_2SO_3$, NaOH+$(NH_4)_2SO_3$, $NH_4OH$+$(NH_4)_2SO_3$, $NH_4OH$+$Na_2SO_3$, NaOH+$Na_2CO_3$, NaOH+AQ, NaOH/$Na_2S$+AQ, NaOH+$Na_2SO_3$+AQ, $Na_2SO_3$+AQ, NaOH+$Na_2S$+$Na_2S_n$, $Na_2SO_3$+NaOH+$CH_3OH$+AQ, $C_2H_5OH$+NaOH, $C_2H_8N_2$, $C_2H_7NO$+$NH_3$–$H_2O$, $N_2H_4$–$H_2O$, and $NaHCO_3$, where n in an integer and AQ is Anthraquinone.

5. The method of claim 1, wherein between 5% and 95% of the lignin has been removed from said piece of natural wood by the treating.

6. The method of claim 1, wherein the using as a flexible structure comprises:
(a) at least one of:
bending or folding the piece of chemically-treated natural wood onto itself;
twisting the piece of chemically-treated natural wood more than 45°; and
wrapping the piece of chemically-treated natural wood around an appendage of a user; and
(b) after (a), releasing the piece of chemically-treated natural wood such that it returns to its original shape.

7. The method of claim 1, further comprising, after the drying, forming a coating on the piece of chemically-treated natural wood.

8. The method of claim 7, wherein the coating comprises at least one of nanoparticles, nanowires, graphene, graphite, single-walled carbon nanotubes, double-walled carbon nanotubes, multi-walled carbon nanotubes, carbon black, graphite, hard carbon, reduced graphene oxide, graphene, plasmonic metallic nanoparticles, and semiconductor nanoparticles.

9. The method of claim 7, wherein the coating is comprised of carbon nanotubes (CNT) and the forming comprises:
(a) immersing the piece of chemically-treated natural wood in a CNT solution; and
(b) after (a), drying the piece of chemically-treated natural wood.

10. The method of claim 9, further comprising:
prior to the forming a coating, forming at a first surface of said piece a plurality of micro-sheet protrusions extending therefrom,
wherein the forming a coating is such that the coating is formed on the micro-sheet protrusions.

11. The method of claim 10, further comprising, after the forming a coating:
placing a second surface of the piece of chemically-treated natural wood, opposite to the first surface, in contact with a fluid source; and
exposing the coated first surface to a source of light, such that fluid pumped to the first surface from the second surface via capillary action and/or nano-cavitation effects is heated to generate steam or vapor.

12. The method of claim 9, wherein:
the piece of chemically-treated natural wood has a first surface;
the forming is such that the coating is formed on at least the first surface and inner surfaces of the lumina; and
the method further comprises:
after the forming the coating, depositing a plurality of catalytic nanoparticles and/or electroactive particles on a surface of the coating;
after the depositing, disposing a separator membrane between an anode and a second surface of the piece of chemically-treated natural wood, the second surface being opposite to the first surface; and
filling at least the piece of chemically-treated natural wood with an electrolyte solution.

13. The method of claim 12, further comprising:
applying a voltage between the piece of chemically-treated natural wood and the anode so as to store charge therein.

14. The method of claim 1, further comprising:
coupling non-wood particles to one or more surfaces of said piece of chemically-treated natural wood,
wherein the particles comprise metallic nanoparticles, metal alloy nanoparticles, sulfides, phosphides, borides, or oxides.

15. A method comprising:
treating a piece of natural wood with a chemical solution so as to partially remove hemicellulose and lignin therein, wherein after the treating, the piece of chemically-treated natural wood retains at least some lignin and cellulose-based lumina defined by wood cells formed of cellulose nanofibers; and
freeze-drying the piece of chemically-treated natural wood such that the retained cellulose-based lumina remain open in a cross-sectional view,
wherein a flexibility of the piece of chemically-treated natural wood after the treating and the freeze-drying is greater than a flexibility of the piece of natural wood before the treating and the freeze-drying, and the freeze-drying is performed after the treating and without any rinsing in between, such that cellulose nanofibers, which were released from the wood cells during the treating and disposed within inner volumes of the cellulose-based lumina, are entangled with each other to form entangled fiber networks within the inner volumes of the cellulose-based lumina.

16. A method comprising:

treating a piece of natural wood with a chemical solution so as to partially remove hemicellulose and lignin therein, wherein after the treating, the piece of chemically-treated natural wood retains at least some lignin and cellulose-based lumina defined by wood cells formed of cellulose nanofibers;

after the treating, drying the piece of chemically-treated natural wood; and after the drying, filling the lumina of the chemically-treated natural wood with a flexible polymer comprising hydrogel or a silicone polymer, wherein a flexibility of the piece of chemically-treated natural wood after the filling with the flexible polymer is greater than a flexibility of the piece of natural wood before the treating.

17. The method of claim 16, further comprising:

prior to the filling with a flexible polymer, forming a coating on the piece of chemically-treated natural wood.

* * * * *